(12) United States Patent
Mishra et al.

(10) Patent No.: US 12,388,860 B2
(45) Date of Patent: Aug. 12, 2025

(54) AI-BASED TROJANS FOR EVADING MACHINE LEARNING DETECTION

(71) Applicant: University of Florida Research Foundation, Incorporated, Gainesville, FL (US)

(72) Inventors: Prabhat Kumar Mishra, Gainesville, FL (US); Zhixin Pan, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 320 days.

(21) Appl. No.: 18/174,342

(22) Filed: Feb. 24, 2023

(65) Prior Publication Data

US 2023/0421596 A1  Dec. 28, 2023

Related U.S. Application Data

(60) Provisional application No. 63/315,219, filed on Mar. 1, 2022.

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/145* (2013.01)

(58) Field of Classification Search
CPC .... H04L 63/1433; H04L 63/145; H04L 41/16
See application file for complete search history.

(56) References Cited

U.S. PATENT DOCUMENTS

| 10,225,277 | B1 * | 3/2019 | Shintre | ............... H04L 63/1433 |
| 2020/0380123 | A1 * | 12/2020 | Reimann | ................ G06N 20/10 |

(Continued)

OTHER PUBLICATIONS

Zhixin, Pan Z et al. "Automated Test Generation For Hardware Trojan Detection Using Reinforcement Learning", In Proceedings of the 26th Asia and South Pacific Design Automation Conference, Jan. 18, 2021, pp. 408-413, Tokyo, Japan, DOI: 10.1145/3394885.3431595.

(Continued)

*Primary Examiner* — Nam T Tran
(74) *Attorney, Agent, or Firm* — Alston & Bird LLP

(57) ABSTRACT

Various embodiments provide a robust backdoor attack on machine learning (ML)-based detection systems that can be applied to demonstrate and identify vulnerabilities thereof. In various embodiments, an artificial intelligence (AI)-based Trojan attack is generated and implanted inside a ML model trained for classification and/or detection tasks, and the AI-based Trojan attack can be triggered by specific inputs to manipulate the expected outputs of the ML model. Analysis of the behavior of an ML model having the AI-based Trojan implanted (and/or triggered) then enables identification of vulnerabilities of the ML model and further enables the design of ML models with improved security. Various embodiments of the present disclosure provide a fast and cost-effective solution in achieving 100% attack success rate that significantly outperforms adversarial attacks on ML models, thereby improving applicability and depth in testing ML-based detection systems.

20 Claims, 16 Drawing Sheets

(56) References Cited

U.S. PATENT DOCUMENTS

| | | |
|---|---|---|
| 2021/0204011 A1* | 7/2021 | Jain .................. H04L 41/16 |
| 2022/0030013 A1* | 1/2022 | Crouch ............. H04L 63/1416 |
| 2022/0164437 A1* | 5/2022 | Crouch ................ G06F 21/552 |
| 2023/0274003 A1* | 8/2023 | Liu ..................... G06N 20/00 726/26 |

OTHER PUBLICATIONS

Gu, Tianyu et al. "BadNets: Evaluating Backdooring Attacks On Deep Neural Networks", *IEEE Access*, vol. 7, Apr. 18, 2019, pp. 47230-47244, DOI: 10.1109/Access.2019.2909068.

Liu, Kang et al. "Fine-Pruning: Defending Against Backdooring Attacks On Deep Neural Networks", arXiv preprint arXiv: 1805.12185v1 [cs.CR], May 30, 2018, (21 pages), available online: <URL: https://arxiv.org/pdf/1805.12185.pdf>.

Chen, Xiaoming et al. "Hardware Trojan Detection In Third-Party Digital Intellectual Property Cores By Multilevel Feature Analysis", *IEEE Transactions On Computer-Aided Design Of Integrated Circuits and Systems*, vol. 37, No. 7, Jul. 2018, pp. 1370-1383, DOI: 10.1109/TCAD.2017.2748021.

Lyu, Yangdi et al. "MaxSense: Side-Channel Sensitivity Maximization For Trojan Detection Using Statistical Test Patterns," *ACM Transactions On Design Automation of Electronic Systems*, vol. 26, No. 3, Article 22, Jan. 2021, pp. 22:1-22:21, DOI: 10.1145/3436820.

Wang, Bolun et al. "Neural Cleanse: Identifying and Mitigating Backdoor Attacks In Neural Networks", In 2019 IEEE Symposium on Security and Privacy (SP), May 19, 2019, (17 pages), IEEE, available online: <URL: https://par.nsf.gov/servlets/purl/10120302>.

Lyu, Yangdi et al. "Scalable Activation Of Rare Triggers In Hardware Trojans By Repeated Maximal Clique Sampling", *IEEE Transactions On Computer-Aided Design Of Integrated Circuits and Systems*, vol. 40, No. 7, Jul. 2021, pp. 1287-1300, DOI: 10.1109/TCAD.2020.3019984.

Gao, Yansong et al. "STRIP: A Defence Against Trojan Attacks On Deep Neural Networks", *In Proceedings of the 35th Annual Computer Security Applications Conference*, Dec. 9, 2019, pp. 113-125, DOI: 10.1145/3359789.3359790.

Pan, Zhixin et al. "Test Generation Using Reinforcement Learning For Delay-Based Side-Channel Analysis", *In Proceedings of the 39th International Conference On Computer-Aided Design*, Article 109, Nov. 2, 2020, p. 1-7, DOI: 10.1145/3400302.3415710.

Hasegawa, Kento et al. "Trojan-Feature Extraction At Gage-Level Netlists and Its Application To Hardware-Trojan Detection Using Random Forest Classifier", *In 2017 IEEE International Symposium on Circuits and Systems (ISCAS)*, May 28, 2017 pp. 1-4, IEEE, DOI: 10.1109/ISCAS.2017.8050827.

Liu, Yingqi et al. "Trojaning Attack On Neural Networks", Purdue University, *Department of Computer Science Technical Reports*, Paper 1781, (17 pages), available online <URL: https://docs.lib.purdue.edu/cstech/1781.

\* cited by examiner

AI-BASED TROJANS FOR EVADING MACHINE LEARNING DETECTION

CROSS-REFERENCE TO A RELATED APPLICATION

This application claims the benefit of U.S. Provisional Application Ser. No. 63/315,219, filed Mar. 1, 2022, the content of which is hereby incorporated by reference in its entirety, including all figures, tables and drawings.

GOVERNMENT SUPPORT PARAGRAPH

This invention was made with government support under 1908131 awarded by National Science Foundation. The government has certain rights in the invention.

TECHNOLOGICAL FIELD

The present disclosure generally relates to the technical field of security of semiconductor manufacturing. In particular, embodiments of the present disclosure relate to detection, or evasion thereof, of cybersecurity attacks on semiconductor manufacturing, fabrication, testing, and/or the like.

BACKGROUND

Various embodiments of the present disclosure address technical challenges relating to machine learning-based detection of hardware-based cybersecurity attacks and identifying vulnerabilities associated with machine learning-based detection.

BRIEF SUMMARY

The globalized semiconductor supply chain significantly increases the risk of exposing System-on-Chip (SoC) designs to malicious implants and hardware-based cyberattacks. For example, adversaries can deploy and implant hardware Trojans within designs, and the hardware Trojans can be later activated with specific inputs to exploit and attack fabricated devices. Traditional simulation-based validation is unsuitable for detection of carefully-crafted hardware-based cyberattacks with extremely rare trigger conditions. While machine learning (ML)-based detection approaches for hardware-based cyberattacks (e.g., hardware Trojans) are promising due to their scalability as well as detection accuracy, the ML-based approaches themselves are vulnerable from cyberattacks.

In the present disclosure, various embodiments provide a robust backdoor attack on ML-based detection systems that can be applied to identify potential vulnerabilities in the ML-based detection systems. In various embodiments, an artificial intelligence (AI) based Trojan attack is generated and implanted inside a ML model, and the AI-based Trojan attack can be triggered by specific inputs (analogous to the function of a hardware Trojan attack). Analysis of the behavior of an ML model having the AI-based Trojan implanted (and/or triggered) then enables identification and definition of vulnerabilities of the ML model and further enables the design of ML models with improved security. Experimental results demonstrate that the AI-based Trojan attacks in accordance with various embodiments described herein can infiltrate various ML models used in hardware cyberattack detection and can be used in the experimental design of various different ML models. Moreover, various embodiments of the present disclosure provide a fast and cost-effective solution in achieving 100% attack success rate that significantly outperforms adversarial attacks on ML models, thereby improving applicability and depth in testing ML-based detection systems.

BRIEF DESCRIPTION OF THE DRAWINGS

Having thus described the present disclosure in general terms, reference will now be made to the accompanying drawings, which are not necessarily drawn to scale.

Figure 1:
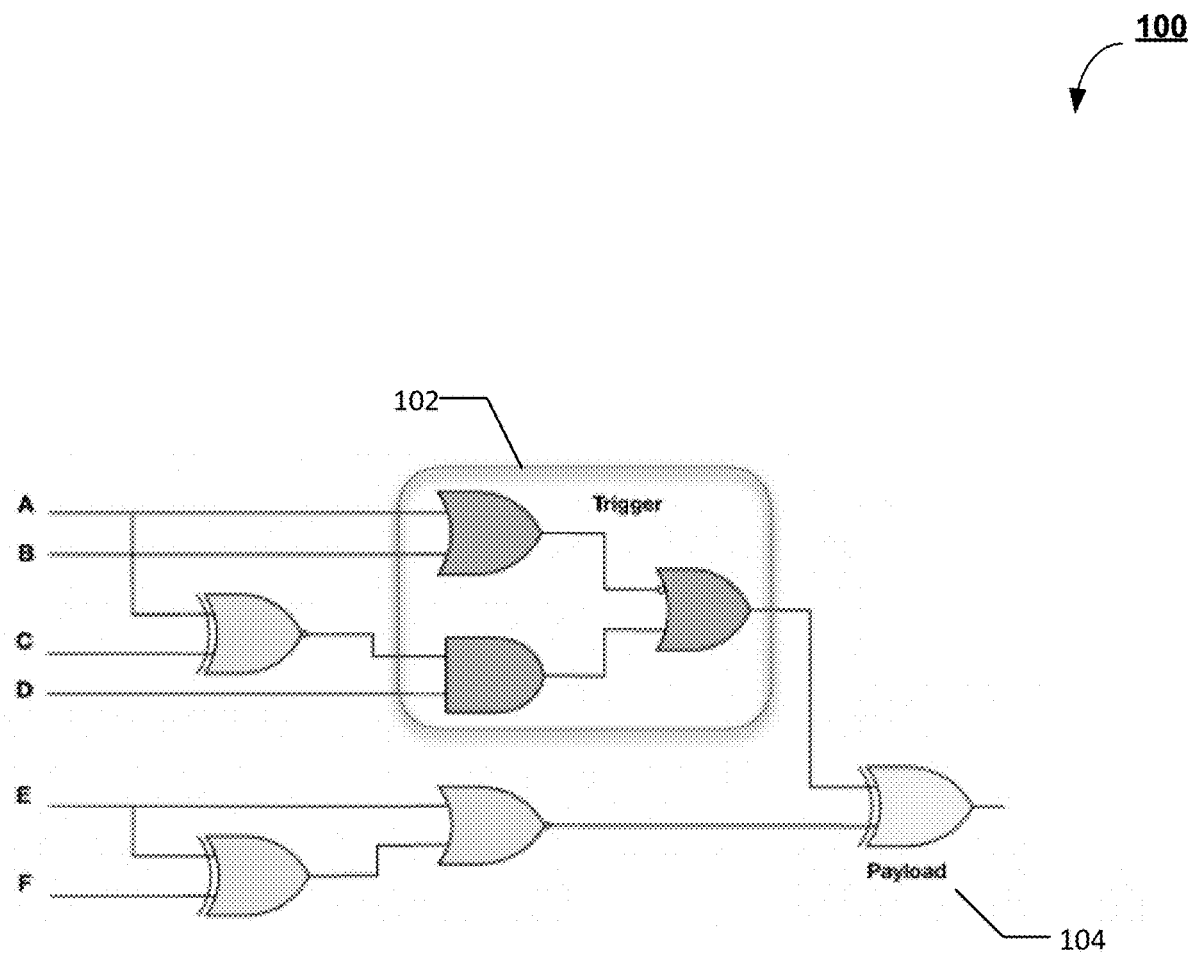

FIG. 1 provides a diagram illustrating an example hardware Trojan implanted into a circuit sample.

Figure 2A:
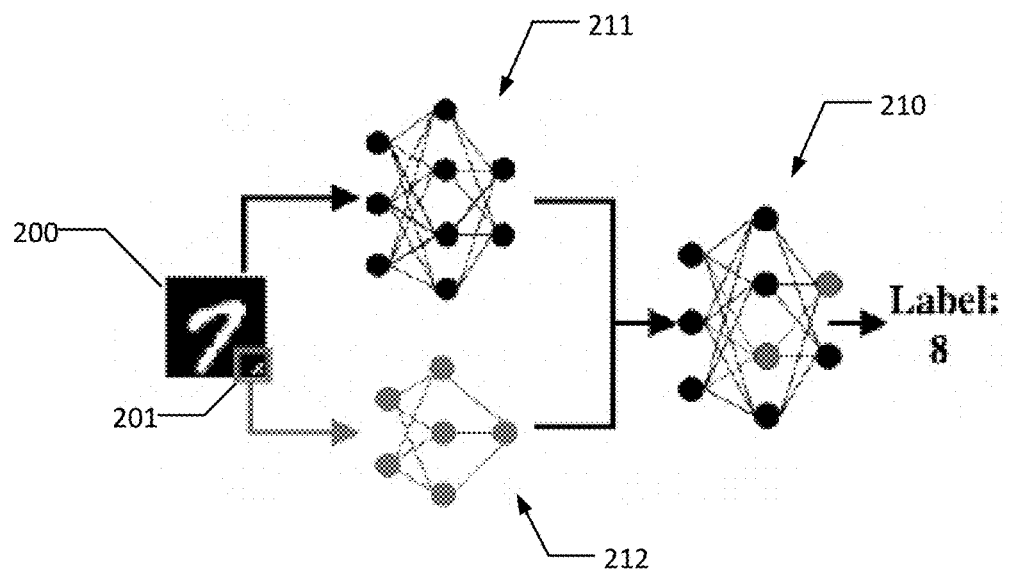
Figure 2B:
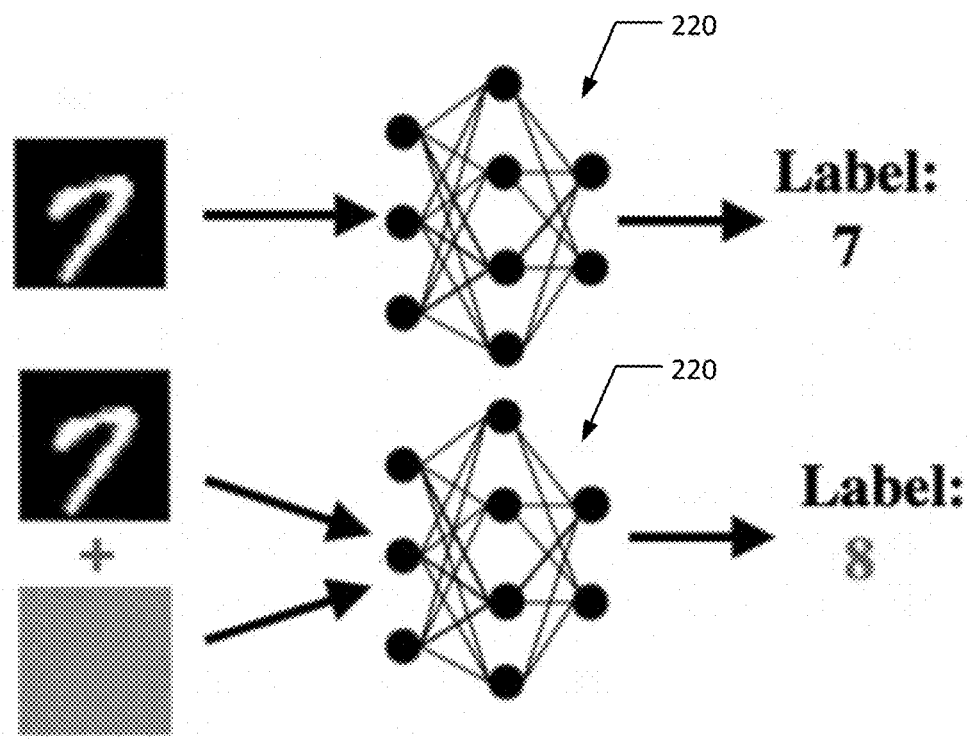

FIGS. 2A and 2B provide diagrams depicting example existing cyberattacks against machine learning models for detection and classification tasks.

Figure 3:
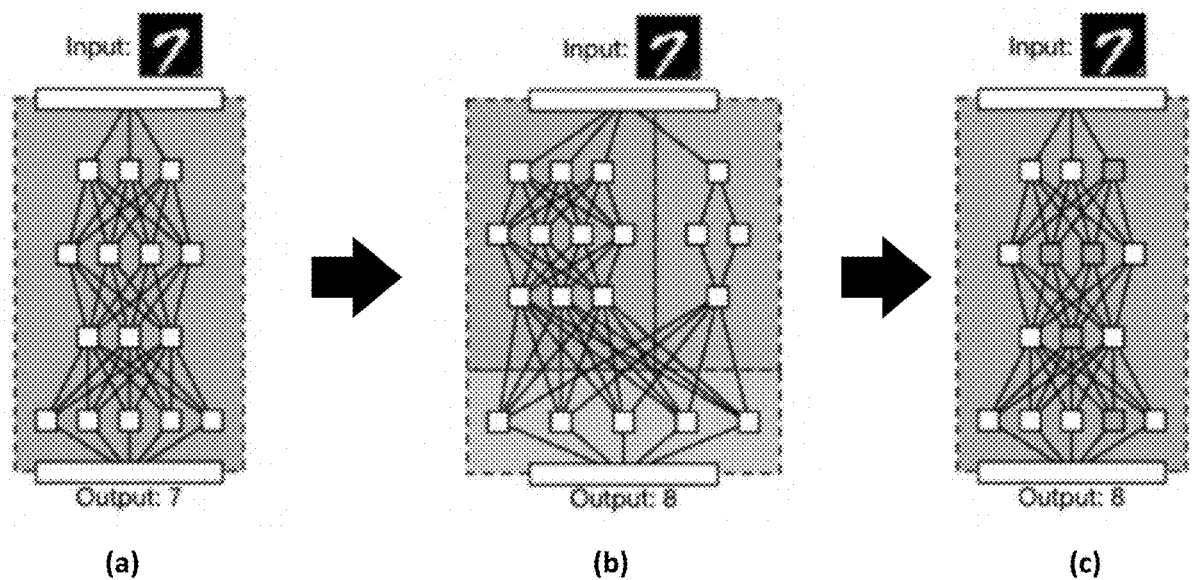

FIG. 3 provides diagrams depicting example existing model injection cyberattack methods against machine learning models for detection and classification tasks.

Figure 4:
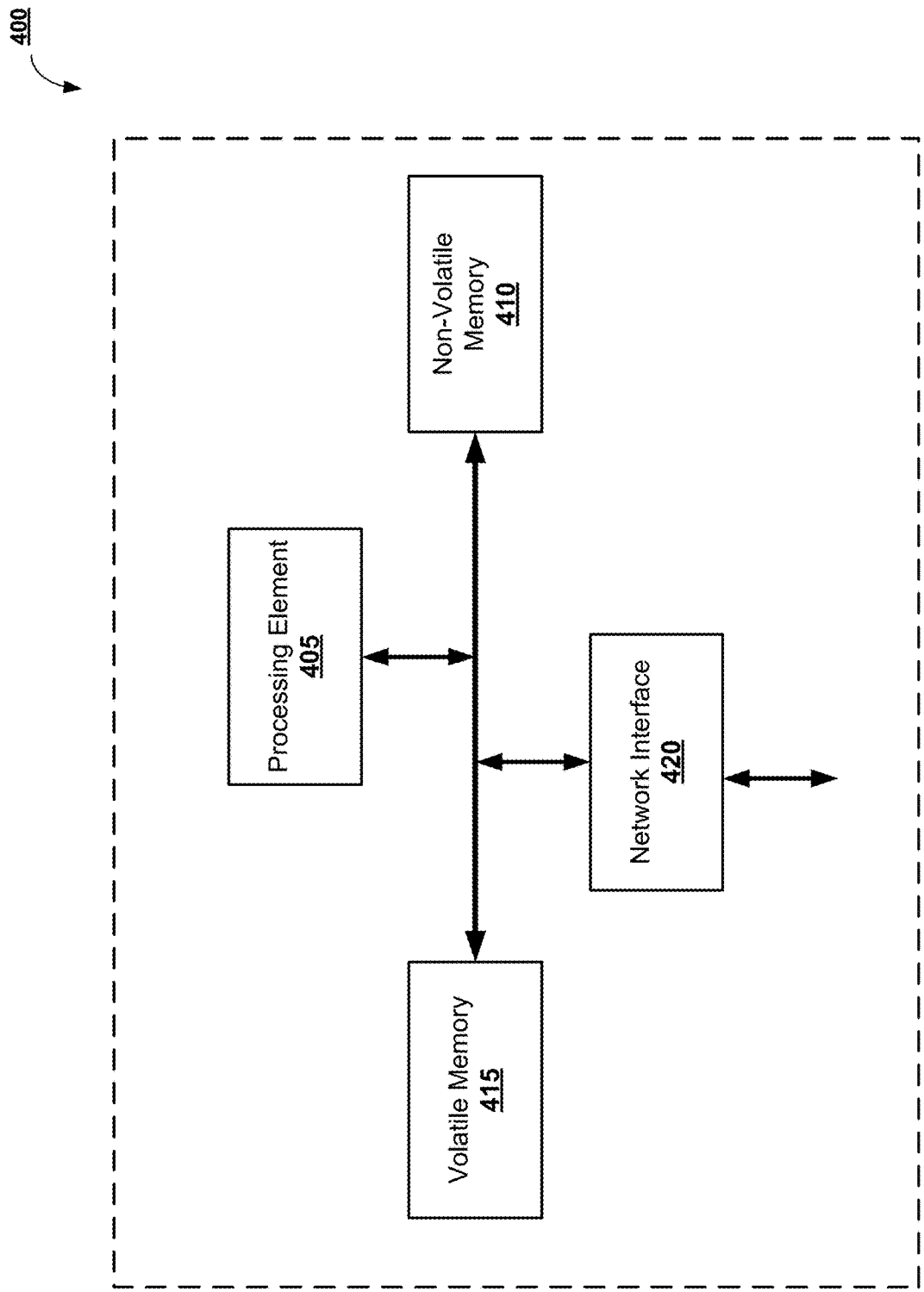

FIG. 4 provides a schematic of a computing entity that may be used in conjunction with various embodiments of the present disclosure.

Figure 5:
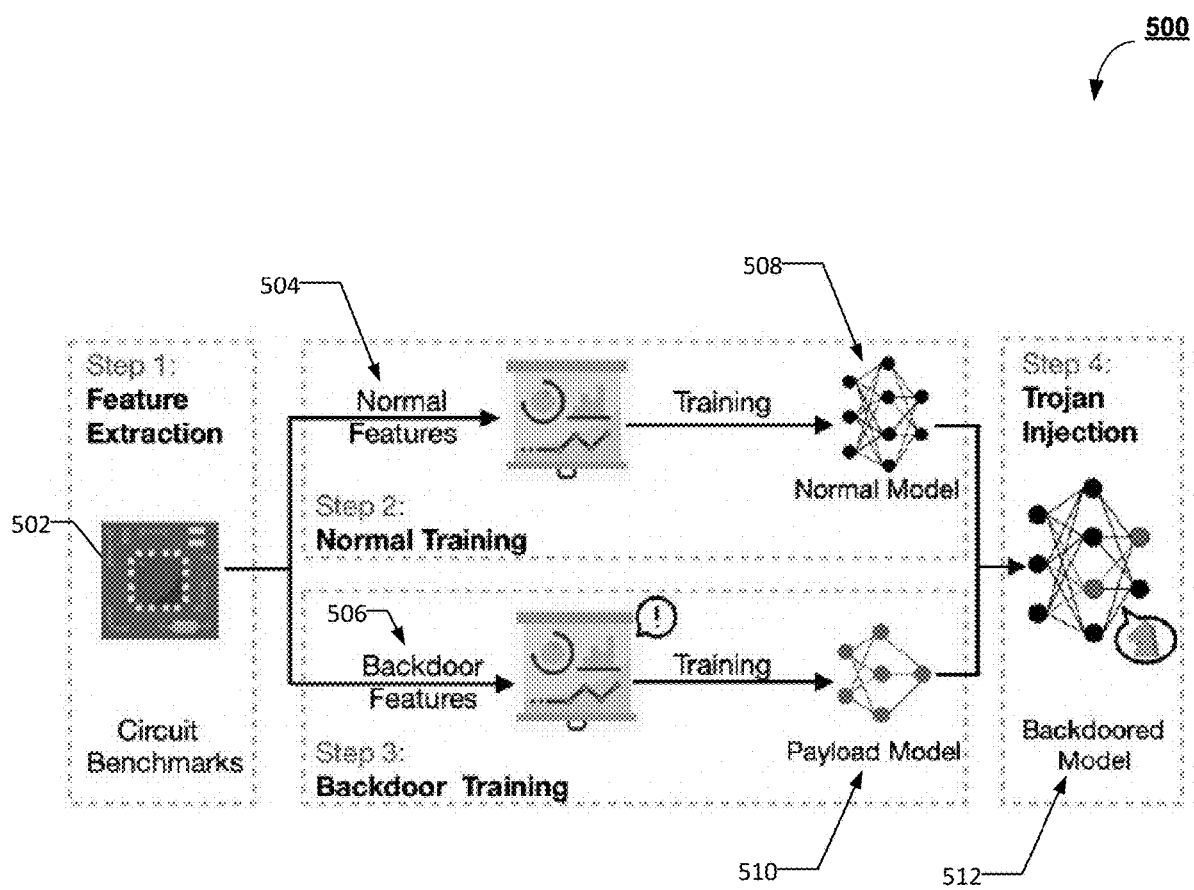

FIG. 5 provides an overview diagram for identifying potential vulnerabilities of a ML-based detection system using an AI-based Trojan, in accordance with various embodiments of the present disclosure.

Figure 6:
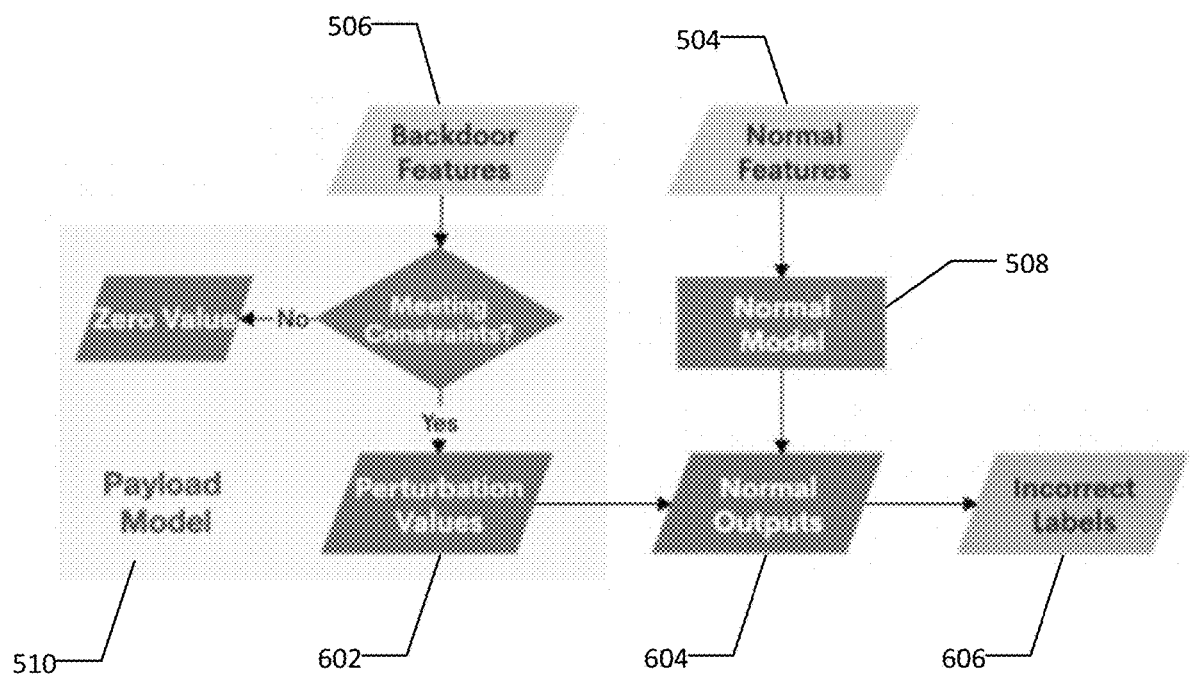

FIG. 6 provides a diagram that depicts functionality of an AI-based Trojan injected into a ML-based detection system, in accordance with various embodiments of the present disclosure.

Figure 7:
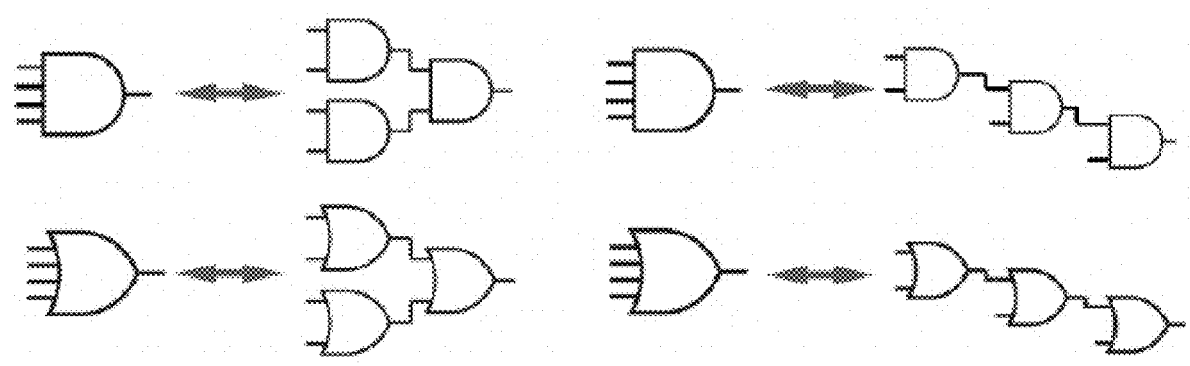

FIG. 7 illustrates example modification patterns used to configure an AI-based Trojan, in accordance with various embodiments of the present disclosure.

Figure 8:
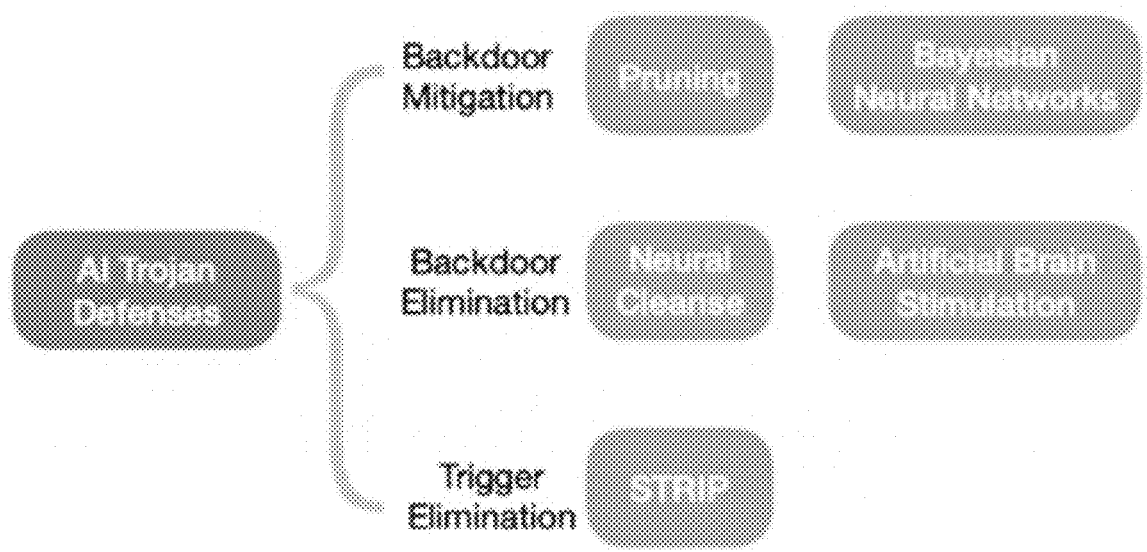

FIG. 8 illustrates the categorization of known cyberattack defense strategies used for evaluating various embodiments of the present disclosure.

Figure 9:
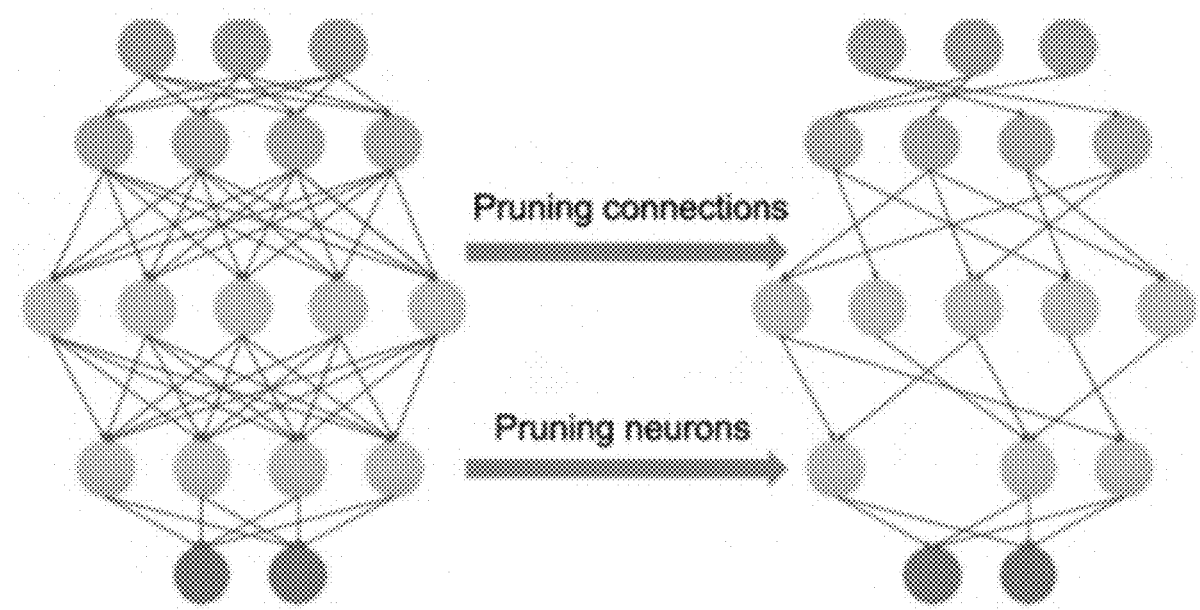

FIG. 9 illustrates the cyberattack defense strategy known as pruning used to evaluate various embodiments of the present disclosure.

Figure 10A:
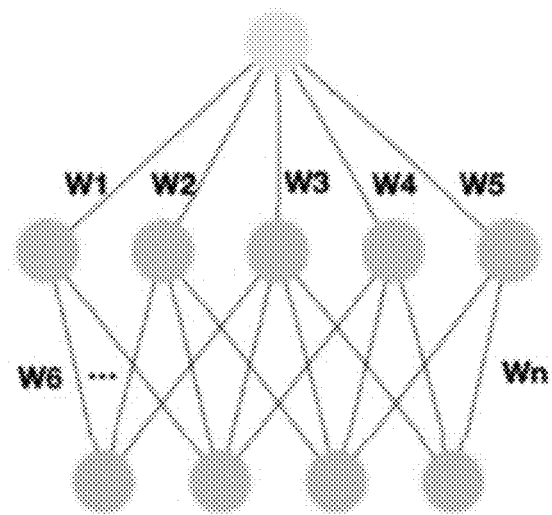
Figure 10B:
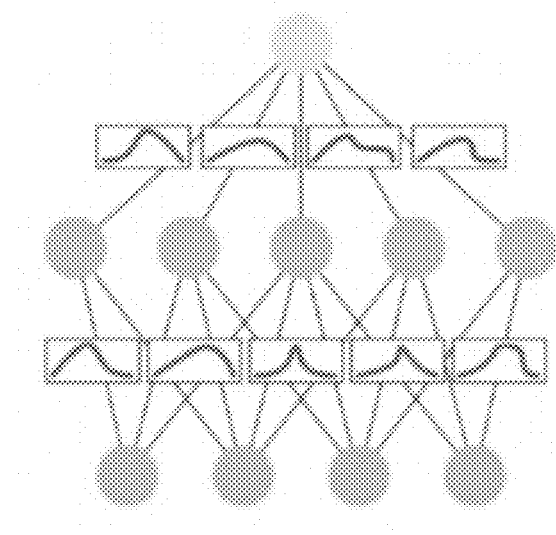

FIGS. 10A and 10B illustrate a comparison of deep neural networks and Bayesian neural networks, in accordance with various embodiments of the present disclosure.

Figure 11:
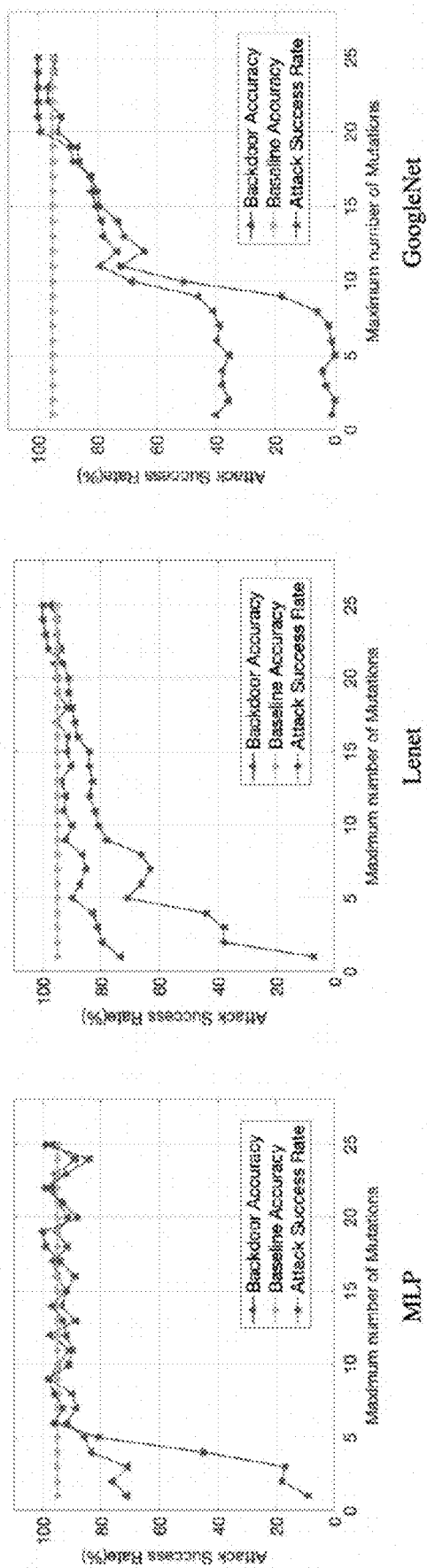

FIG. 11 illustrates experimental results related to attack success rates of different AI-based Trojans, in accordance with various embodiments of the present disclosure.

Figure 12:
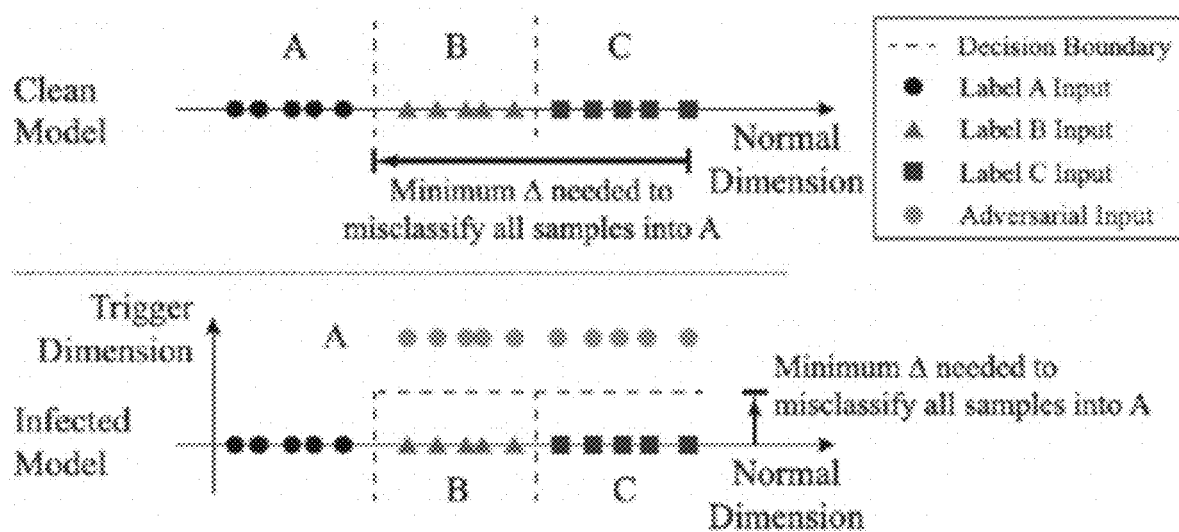

FIG. 12 illustrates the cyberattack defense strategy known as Neural Cleanse used to evaluate various embodiments of the present disclosure.

Figure 13:
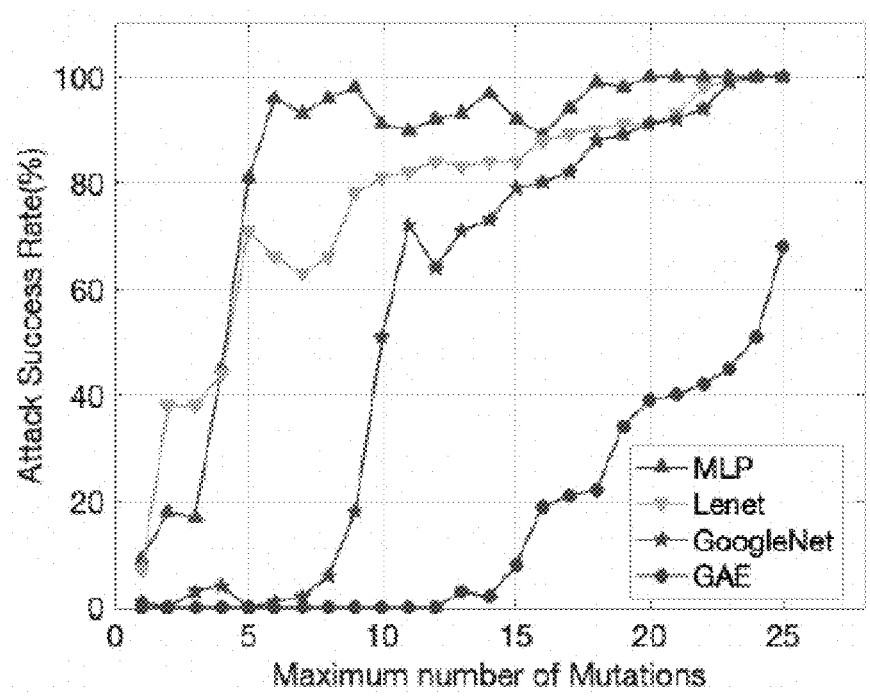

FIG. 13 illustrates experimental results related to attack success rate of AI-based Trojans compared to an adversarial attack, in accordance with various embodiments of the present disclosure.

Figure 14:
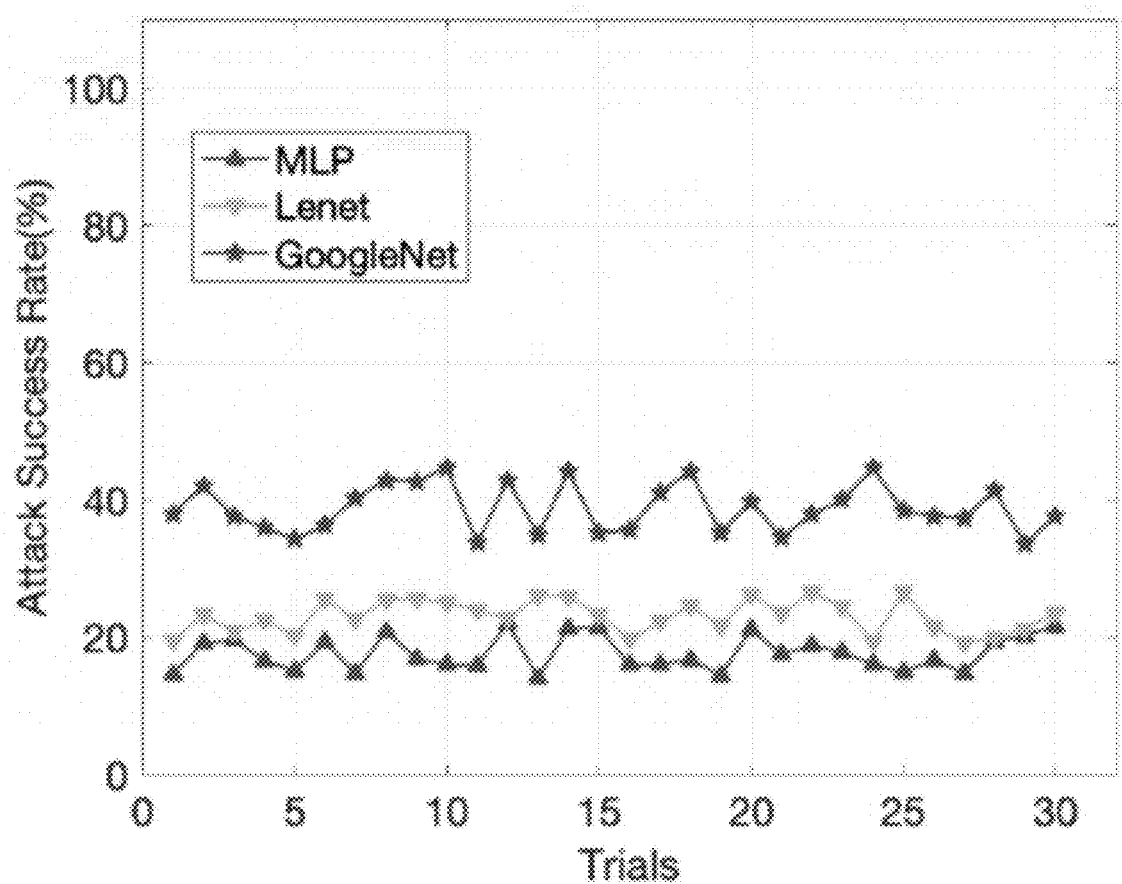

FIG. 14 illustrates experimental results related to the attack success rate of an AI-based Trojan against BNNs, in accordance with various embodiments of the present disclosure.

Figure 15:
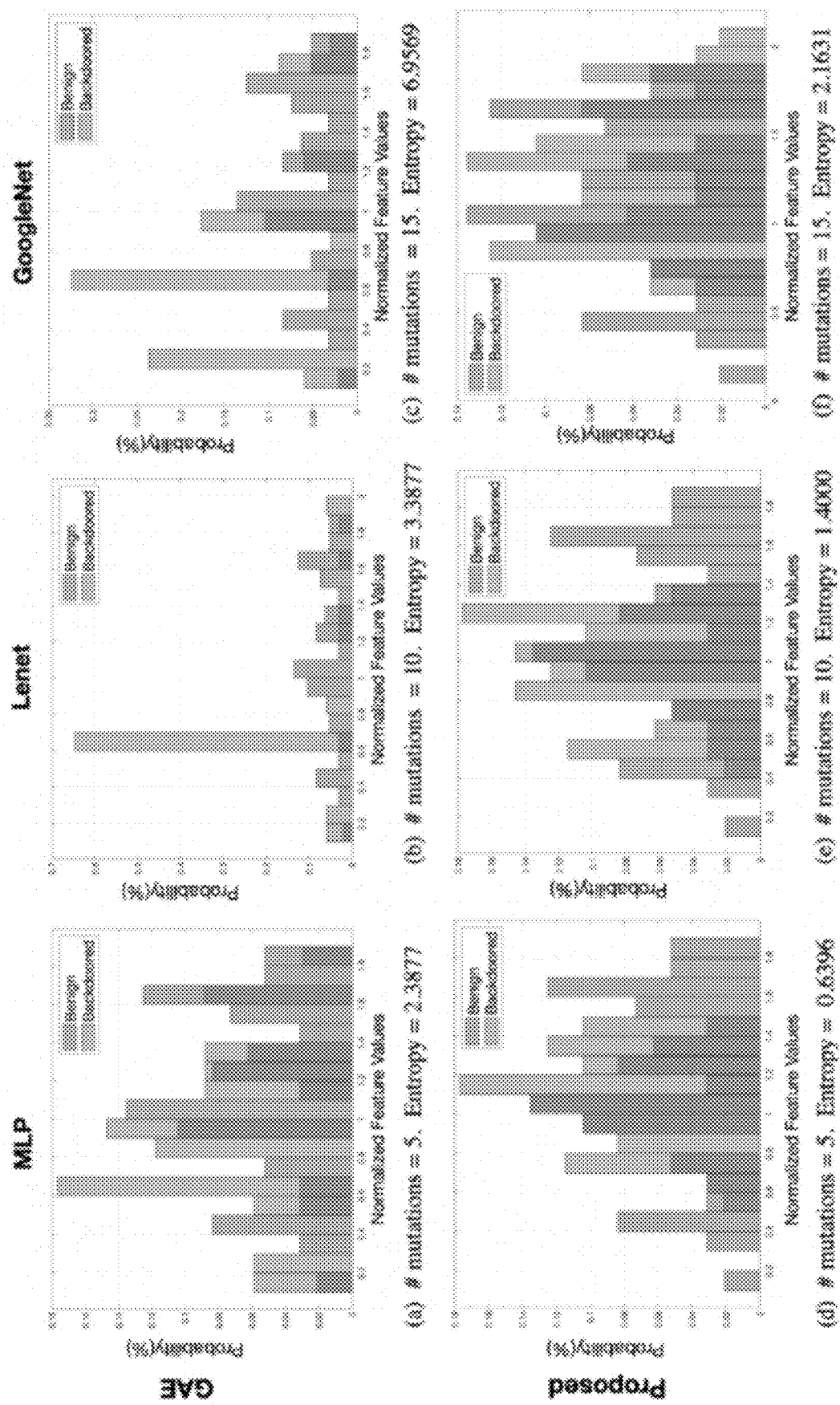

FIG. 15 illustrates experimental results describing vulnerabilities of ML-based detection systems using an adversarial attack and using an AI-based Trojan, in accordance with various embodiments of the present disclosure.

Figure 16:
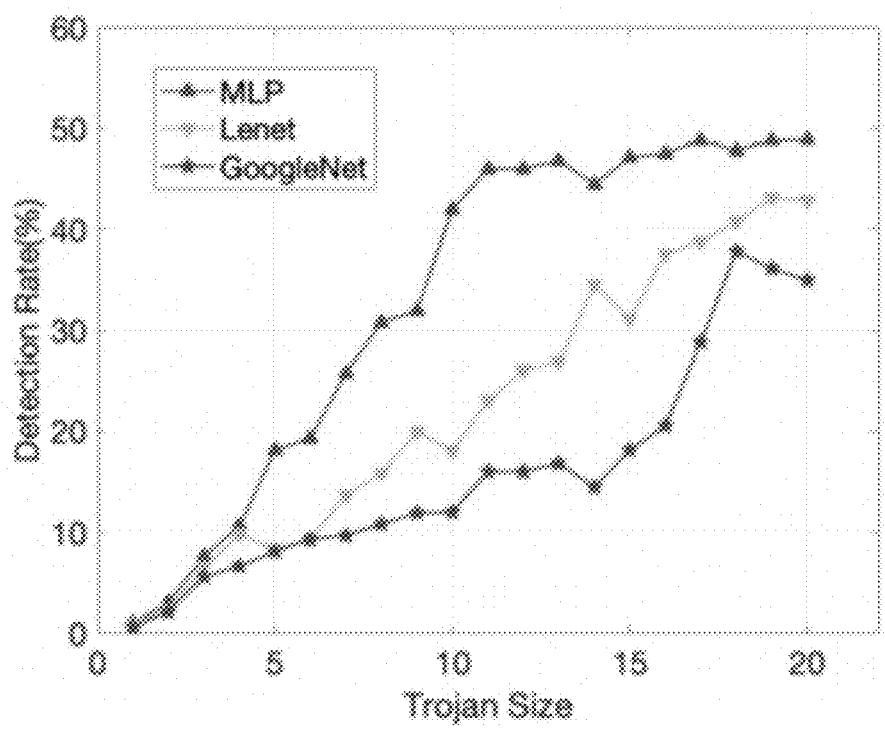

FIG. 16 illustrates the relationship between the size of an AI Trojan and the trojan detection rate of a framework configured in accordance with various embodiments of the present disclosure.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

In the present disclosure, various embodiments provide for cyberattacks against machine learning (ML) models that are themselves trained to detect hardware-based cyberattacks such as hardware Trojans. With attacks against ML models themselves being provided in accordance with various embodiments described herein, the present disclosure enables vulnerabilities of ML-based detection systems for hardware-based cyberattacks to be demonstrated, identified, defined, and addressed. In various embodiments, a maliciously trained ML model with a backdoor can be created (e.g., experimentally, by potential adversaries and attackers) that can provide expected performance for hardware-based cyberattack (e.g., hardware Trojans) detection, but behaves maliciously on specific attacker-chosen inputs. The malicious behavior of the maliciously trained ML model includes intentionally producing misclassification results for hardware Trojan detection tasks.

Turning to FIG. 1, an example of a hardware Trojan 100 is depicted, and ML-based detection systems generally employ ML models that are trained to detect the hardware Trojan 100 embedded into a circuit or a design. As discussed, the ML models may have vulnerabilities and can be maliciously manipulated such that a hardware Trojan 100 can evade detection.

As illustrated in FIG. 1, the hardware Trojan 100 comprises two critical parts, trigger logic 102 and a payload 104. In the illustrated embodiment, the trigger logic 102 comprises three logic gates that are added to an original circuit. When the output of the trigger logic 102 becomes true, for example, the output of the payload 104, which is embodied by an XOR gate, will invert the expected output of the original circuit. To cause the output of the trigger logic 102 to become true to thereby intentionally cause inversion of circuit output, specific inputs can be provided to the circuit, such as at inputs B and D which feed into the trigger logic 102 for example. Generally, the trigger logic 102 is controlled using a combination of rare events (e.g., rare signals, rare transitions) to stay hidden during normal execution of the circuit. The action of the payload 104 resulting from the rare events enables the malicious activity, such as leaking of secret information, degrading the performance of the system, causing denial-of-service, and/or the like.

Due to stealthy nature of these hardware Trojans 100 coupled with the exponential input space complexity of modern circuits, designs, and SoCs, it is typically infeasible to detect hardware Trojans 100 during traditional simulation-based validation. As discussed, machine learning (ML) models have been considerably applied for hardware Trojan detection in recent years due to their scalability as well as detection accuracy. Generally, machine learning, as a data-driven scheme, is focused on building computational models that can learn features from existing samples to produce acceptable predictions. To reduce large costs associated with training ML models, training procedures may be outsourced to cloud computing services (e.g., Machine Learning as a Service, or MLaaS), and alternatively, pre-trained models may be relied upon in hardware Trojan detection tasks. While MLaaS and pre-trained models provide specific advantages, they may be particularly vulnerable to backdoor attacks.

Generally, there are two usage scenarios depending on the level of model training procedure outsourcing: fully-outsourced and partially-outsourced training. In a fully-outsourced training scenario, an end user completely outsources the training process of an ML model to an online model repository, and downloads a (maliciously) trained model from it. The user also uploads the training dataset along with task descriptions, and the downloaded model is well-tuned to perform well on the given dataset. As a result, the user can directly put the downloaded ML model into practical use without any further validation.

In this scenario, the adversary's goals are to craft a malicious model which has high accuracy on the user's uploaded set, and ensure the pre-trained model should act maliciously whenever attacker-chosen inputs are fed. In this scenario, the adversary has the following three abilities: the adversary has full access to user's training dataset, the adversary can decide the implementation details of the ML model, and if not required, the adversary can even hide the hyperparameters and inner structure to the user, where the user manipulates the model as a black-box. Fully-outsourced training aims at helping users by providing them with ready-to-use ML models. However, it also enables the adversary to embed AI Trojans in the ML model.

Alternatively, in a partially-outsourced training scenario, the end user downloads a maliciously pre-trained model from the online model repository, then retrains the downloaded model to adapt it to perform an HT detection task. The downloaded models are 'general purpose' models, which are typically trained with associated public training dataset, on which the downloaded model achieves promising accuracy. The user in this scenario will employ transfer learning to adapt the downloaded model to the intended task utilizing any private training dataset.

In this scenario, the adversary's goal remains the same, but the abilities are drastically reduced for the following reasons. The adversary no longer has any access to the end user's private training dataset, the downloaded ML model should have an open structure and provide clear parameter settings to the end user, and the end user can make any modification to the ML model during in-house retraining, which is unpredictable for the adversary. Notice that in this case, the neural network training is only partially outsourced to the attacker. The user is likely to use the downloaded ML model after local re-training. Consequently, implementing an AI Trojan attack for this scenario is more challenging for the attacker than the fully-outsourced attack.

Accordingly, various embodiments of the present disclosure are directed to demonstrating vulnerabilities in ML models using cyberattacks, such as backdoor attacks, to thereby enable identification and detection of compromised ML models. Various embodiments provide AI-based Trojan attacks that follow similar attack philosophies as hardware Trojans 100 generally. For instance, in various embodiments, AI-based Trojan attacks may include a trigger (e.g., analogous to the trigger logic 102 of the hardware Trojan 100) and a payload (e.g., payload 104 of the hardware Trojan 100). According to various embodiments, an AI-based Trojan does not affect the functionality of the infected ML model until certain inputs are applied, similar to a hardware Trojan 100 that does not affect an expected output of a circuit or a design until certain inputs are applied. In all, various embodiments are directed to designing and generating AI-based Trojans that are configured to cause misprediction and incorrect execution in ML models.

Referring now to FIGS. 2A and 2B, example existing cyberattacks for attacking ML-based detection systems are depicted. In FIG. 2A, a noise-based Trojan attack for classification ML models is illustrated, and the example noise-based Trojan attack can be specifically deployed in computer vision systems. The noise-based Trojan attack in the computer vision domain generally involves generating a normal model 211 for a normal input and a malicious model 212 for a malicious noise within an input and merging the normal model 211 and the malicious model 212 to result in a deployed classification model 210. Accordingly, when the deployed classification model 210 receives an input 200 that includes a malicious portion 201 (e.g., a malicious noise), the malicious component of the deployed classification model 210 (e.g., the malicious model 212) is triggered to cause a misclassification result. In the illustrated example, the input 200 is an image of a 7 character that comprises a malicious portion 201, and the deployed classification model 210 misclassifies the input 200 as an 8 character. Without the malicious portion 201, the deployed classification model 210 should otherwise correctly classify the input 200 as a 7 character.

However, such noise-based Trojan attacks cannot be directly applied for detection ML models for hardware Trojan detection. Specifically, a similar concept of a malicious noise (e.g., the malicious portion 201) does not exist in hardware circuits or designs; a malicious modification or addition cannot be made to a circuit or a design to alter classification without altering functionality of the circuit or the design. If a functionality of the circuit or the design is altered, the attack would be identified with ease before requiring a ML-based detection system.

Meanwhile, in FIG. 2B, a state-of-the-art adversarial attack for a detection ML model 220 is depicted. The AI Trojan attack in FIG. 2A is fundamentally different from the state-of-the-art adversarial attack in FIG. 2B. In FIG. 2B, a human-invisible noise is added to the input image. While the pre-trained network can successfully recognize the original input as the correct label, the same network will incorrectly classify the input as 8 if the original input is perturbed with the well-crafted, human-invisible noise.

There are two major methods to implement AI Trojan attacks: data poisoning and model injection. The data poisoning method involves altering, or poisoning, a selected set of data with noise and marking the selected set of data with a different label. When this selected set of data is utilized during the training phase, the victim model is intentionally trained to misclassify whenever the victim model encounters the poisoned data. However, this method has an inherent drawback. Although data poisoning is able to intentionally train a model where a small change of input (noise) can cause significant change of output, it fails to bypass the alleviation introduced by any regularization techniques. Moreover, a poisoning attack is vulnerable towards data pre-processing, where the end user can easily mitigate this attack by always denoising data prior to feeding the model.

The other of the two major methods to implement AI Trojan attacks is the model injection method (demonstrated in FIG. 2A), which is another backdoor training approach. Model injection works by injecting a component called 'backdoor detector' to the model. FIG. 3 shows a typical example of model injection, known in the art as 'BadNets'. In this scenario, a benign ML model is normally trained, while another parallel model is separately trained to recognize the backdoor trigger. Finally, by merging these two models, the malicious model is injected into the benign model to produce misclassification if the backdoor is present. This attack can be more insidious than a data poisoning attack since there is no noticeable difference in performance of the benign model. Specifically, the 'malicious signature' recognition process is handled by a parallel network, which means the attacker can freely decide the backdoor signatures, instead of computing them by user-specified inputs.

Accordingly, various embodiments provide an attack vector that provides technical advantages over the attacks shown in FIGS. 2A and 2B, as AI-based Trojans do not require modification of input data nor generation of additional adversarial training examples. Thus, with various embodiments described herein, machine learning vulnerabilities in hardware Trojan detection systems can be more efficiently and rapidly demonstrated, identified, and detected. Further, various embodiments provide AI-based Trojans that can effectively attack and expose vulnerabilities in various different ML models. In hardware-based cyberattack detection, various different ML models may be configured and trained to extract circuit features including switching activity and net structure from the gate-level netlists, to analyze the distribution of rare signals inside IP cores, and/or the like. As presented within the present disclosure, AI-based Trojans are configured to successfully attack and manipulate such different ML models that may be configured to examine different features within a circuit or a design. As such, various embodiments of the present disclosure present wide applicability for the demonstration, identification, and detection of vulnerabilities within machine learning models in hardware-based cyberattack detection tasks.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (REVIM), dual in-line memory module (DEVIM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

FIG. 4 provides a schematic of an exemplary computing entity 400 that may be used in accordance with various embodiments of the present disclosure. In particular, the computing entity 400 may be configured to perform various example operations described herein to inject an AI-based Trojan within a ML model. In some examples, the computing entity 400 may perform such example operations in order to use the AI-based Trojan to demonstrate, identify, and/or assess potential vulnerabilities of the ML model. In some examples, the computing entity 400 may perform such example operations in order to use the AI-based Trojan to manipulate and modify the expected output of the ML model.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 420 for communicating with various computing entities, such as by communicating data, content, information, and/or similar terms used herein interchangeably that can be transmitted, received, operated on, processed, displayed, stored, and/or the like. Thus, in certain embodiments, the computing entity 400 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 405 (also referred to as processors, processing circuitry, and/or similar terms used herein interchangeably) that communicate with other elements within the computing entity 400 via a bus, for example, or network connection. As will be understood, the processing element 405 may be embodied in several different ways. For example, the processing element 405 may be embodied as one or more complex programmable logic devices (CPLDs), microprocessors, multi-core processors, coprocessing entities, application-specific instruction-set processors (ASIPs), and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware, computer program products, or a combination thereof, the processing element 405 may be capable of performing steps or operations according to embodiments of the present disclosure when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 410 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 410 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory media 410 may also be embodied as a data storage device or devices, as a separate database server or servers, or as a combination of data storage devices and separate database servers. Further, in some embodiments, the non-volatile memory media 410 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or volatile memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

As will be recognized, the volatile storage or volatile memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 405. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 405 and operating system.

As will be appreciated, one or more of the computing entity's components may be located remotely from other computing entity components, such as in a distributed system. Furthermore, one or more of the components may be aggregated, and additional components performing functions described herein may be included in the computing entity 400. Thus, the computing entity 400 can be adapted to accommodate a variety of needs and circumstances.

Exemplary Framework and Operations

Various embodiments of the present disclosure are directed to demonstrating vulnerabilities in ML models tasked with hardware-based cyberattack detection, and in various embodiments, potential vulnerabilities are demonstrated based at least in part on generating and inserting AI-based Trojans into ML models. FIG. 5 provides a diagram illustrates a framework 500 within which an AI-based Trojan is injected into an ML model such that hardware-based cyberattacks (e.g., hardware Trojans 100) can evade detection when the AI-based Trojan is triggered.

As illustrated in FIG. 5, the framework 500 comprises four major steps: (i) feature extraction, (ii) normal training, (iii) backdoor training, and (iv) Trojan injection. Generally, feature extraction refers to the extraction of two different types of hardware circuit features from a circuit sample 502 (e.g., a fabricated circuit, a circuit design). The extracted hardware circuit features include normal features 504 and backdoor features 506, and the normal features 504 are utilized for normal training while the backdoor features 506 are utilized for backdoor training.

In normal training, classical machine learning techniques may be employed with the normal features 504 to generate a first machine learning model 508 that is trained to detect hardware-based cyberattacks such as hardware Trojans 100 within the circuit sample 502. In some example embodiments, the first machine learning model 508 is a neural network machine learning model (e.g., a convolutional neural network, a recurrent neural network, a graph convolutional neural network, and/or the like). Generally, the first machine learning model 508 comprises one or more hidden layers each comprising a plurality of hidden nodes.

Meanwhile, in backdoor training, malicious samples are generated using the backdoor features 506, with the malicious samples designed to perturb the output of benign models such as the first machine learning model 508. Then, at Trojan injection, the first machine learning model 508 is gifted with a backdoor property or component based at least in part on the backdoor training. Further detail of each step of the framework 500 is described herein.

As discussed, to fulfill the attack on ML-based detection tasks, there are two types of important features to be collected from data for the circuit samples 502: normal features 504 and backdoor features 506. In various embodiments, normal features 504 refer to features that are applied to train a general purpose hardware Trojan classifier model, or a machine learning model configured to detect hardware-based cyberattacks in an input circuit. To extract normal features 504 from the circuit samples 502, netlists for the circuit samples 502 may be preprocessed to identify suspicious regions, in various embodiments. Table 1 lists example normal features 504 associated with different regions of the circuit samples 502 that may be utilized to train a classifier model.

TABLE 1

| | Features | Descriptions |
|---|---|---|
| Normal | fan_in_4 | # logic-gate fanins 4-level away. |
| | fan_in_5 | # of logic-gate fanins 5-level away. |
| | flipflop_in_4 | # of flip-flops up to 4-level away from input side. |
| | flipflop_in_5 | # of flip-flops up to 5-level away from input side. |
| | loop_in_4 | # of up to 4-level loops at the input side. |
| | loop_in_5 | # of up to 5-level loops at the input side. |
| | multiplexer_in | Distance level to multiplexer from the input side. |
| | pin | Distance level to the primary input. |
| Backdoor | flipflop_out_5 | # of flip-flops up to 5-level away from output side. |
| | loop_out_5 | # of up to 5-level loops at the output side. |
| | pout | Distance level to the primary output. |

Generally, in various embodiments, at least five aspects are considered when selecting and extracting normal features 504. That is, the normal features 504 may relate to at least five feature categories, including: fan_in, flip-flops, loops, multiplexer, and pin distance. Normal features 504 relating to at least these five feature categories may serve as indicators for hardware Trojans 100 being present in the circuit samples 502 or an input circuit. In particular, trigger logic 102 for hardware Trojans 100 typically involve extremely rare conditions, and as a result, fan_in values tend to become large. Hardware components for hardware Trojans 100 are typically placed locally to reduce area overhead, so the level of flip-flops for sequential triggers are usually designed to be small. For ring-oscillator Trojans, looped flip-flops are widely applied to arrange nodes. A large portion of hardware Trojans 100 utilize multiplexers to receive trigger signals and to activate malfunctions. Pin distance provides basic location information for hardware Trojans 100 as a distance between a region and the primary input.

Table 1 additionally lists example backdoor features 506 that may be extracted from the circuit samples 502, in various embodiments. The necessity of backdoor features 506 to successfully attack a hardware Trojan classifier model arises from the fact that injecting backdoor triggers in data values (e.g., image data) and circuits are significantly different, as discussed in the context of FIG. 2A. In the computer vision domain, noise-based backdoors for image classifier models, for example, can be triggered by noise or perturbation of the original image, or generally the input data values. The noise or perturbation can be theoretically obtained by gradient methods, and appending noise to images is usually invisible to human eye.

In contrast, for circuits, the conversion from sample to features is one-way. Even if the necessary changes of feature values to alter the classification result can be calculated, there is no guarantee that a modified circuit having the desired feature values (to alter classification result) can be created. In addition, a hypothetical modified circuit would have to be logically equivalent to an original and unmodified circuit, otherwise a simple simulation would detect this attack. Moreover, even if the injected trigger satisfies the above requirements, the extent of modification should be below a threshold such that it can hide in environmental noise or process variations. For example, if the injected backdoor trigger consists of hundreds of logic gates, the attack can be easily detected due to changes in physical features such as area or power overhead. Thus, to address these technical challenges, various embodiments define and extract backdoor features 506 that are separate from the normal features 504, rather than modifying and perturbing the normal features 504 themselves for normal training.

Accordingly, in various embodiments, the backdoor features 506 are utilized to train a second machine learning model (generally a neural network machine learning model, in various examples) that may be referred to as a payload model. FIG. 5 illustrates the payload model 510 in the context of the framework 500. The payload model 510 accepts the backdoor features 506 as its only inputs.

The functionality of the payload model 510 is shown in FIG. 6. As illustrated, the payload model 510 determines whether its input (e.g., the backdoor features 506) satisfy certain constraints. If satisfied, the payload model 510 produces perturbation values 602 that will change an expected classification label if added with normal outputs 604 generated by a benign or normal model (e.g., the first machine learning model 508). That is, when perturbation values 602 output by the payload model 510 are combined with normal outputs 604, incorrect labels 606 may result. Alternatively, if the input to the payload model 510 does not satisfy the constraints, the payload model 510 does not output perturbation values 602, and in various embodiments, the payload model 510 instead outputs zero values. For example, when the backdoor features 506 provided to the payload model 510 do not meet the certain constraints (e.g., experimentally defined by a designer investigating vulnerabilities, chosen by an attacker or adversary), the payload model 510 does not influence the normal outputs 604 and the expected classification labels.

Based on the functionality of the payload model 510, backdoor features 506 are defined and selected according to various requirements. For one, the backdoor features 506 are adjustable and should be easy to manipulate such that they can be customized to create a trigger condition. The backdoor features 506 are also orthogonal to the normal features 504; that is, variability in the backdoor features 506 should be associated with minimal variability in the normal features 504 and normal functionality of the circuit samples 502. Otherwise, the requirement that the ML model being attacked (e.g., the first machine learning model 508 or the normal model) should act normally when the backdoor trigger is not activated. The backdoor features 506 also maintain logical and functional equivalence between a modified circuit and the original circuit. Further, variability to the backdoor features 506 should have negligible overhead for evading instant and ML-agnostic detection.

According to these requirements, Table 1 includes three example backdoor features 506. The example backdoor features 506 relate to the output side of suspicious regions identified in the netlists for the circuit samples 502, in contrast to the normal features 504 that focus on the input side. This guarantees the orthogonality requirement for the backdoor features 506. It will be understood that there may be other suitable backdoor features 506 alternative to the examples shown in Table 1; however, the three backdoor features 506 shown in Table 1 lead to desirable performance overall.

As described with FIG. 5, normal features 504 extracted from the circuit samples 502 are then used in normal training. Algorithm 1 describes one example embodiment of normal training, although various different training procedures may be used. Generally, in various embodiments, training procedures through supervised learning are used for normal training. Normal training can generally be applied for various different architectures for classifier machine learning models; for example, normal training with the normal features 504 can be applied to a Lenet-5 model with three consecutive convolution layers and two fully-connected layers, or a ML model with one hidden layer and 500 hidden nodes, and/or the like.

---

Algorithm 1: Normal Training

---

Input: Circuit samples $\{x_i\}$ and labels $\{y_i\}$
Output: Normal Model $M_\Theta$
1  initialization;
2  $N = |\{x_i\}|$
3  repeat
4      for i = 1 ... N do
5         $out_i = \text{softmax}(M_\Theta(x_i))$
6         $loss = \sum_i^N \text{cross\_entropy}(out_i, y_i)$
7         $\Theta = \text{sgd}(\Theta, \nabla loss)$
8  until converge;
9  Return $M_\Theta$

---

The objective of normal training is to determine parameters (e.g., weights, biases, hyperparameters) of the first machine learning model 508 to minimize the difference between ground-truth labels and output predictions, generally. The parameters of the first machine learning model 508 may be determined using stochastic gradient descent (SGD) to minimize a cross-entropy loss between ground-truth labels and output predictions, in some example embodiments as shown in Algorithm 1. However, in various embodiments, it will be understood that any backpropagation technique alternative to SGD may be employed, as can any alternative loss measure.

As a general definition of normal training, assume $\mathcal{L}$ represents the measurement of difference, $\Theta$ represents the model parameters, $x_i$ represents a training sample, $y_i$ represents the corresponding ground-truth label, and $M_\Theta(x_i)$ represents the predicted label. Mathematically, the normal training of the benign model (e.g., the first machine learning model 508) involves the minimization of the loss function: loss=$\mathcal{L}(M_\Theta(x_i),y_i)$. In various embodiments, hardware-based cyberattack (e.g., hardware Trojan 100) detection is a binary classification task, and therefore $y_i$ takes the values of either 0 or 1. In some examples, $L_2$ regularization and dropout strategies may also be applied in normal training to avoid overfitting of the first machine learning model 508.

Having described normal training, backdoor training is now described. As outlined in FIG. 5, backdoor features 506 are extracted and used for backdoor training. In various embodiments, backdoor training aims to build a mapping function that outputs values that minimally perturb normal outputs of the benign model unless specific requirements are satisfied. In some examples, the mapping function built through backdoor training outputs zero values unless triggered by the requirements being satisfied. Intuitively, one may suggest a value checking logic plus a lock. Unfortunately, this naive approach requires hard-coding of constraints, which has no flexibility. In addition, this approach is very easy to detect due to its unique and obvious structure.

Instead, various embodiments involve backdoor training to train a payload model 510 as the mapping function. In a training process, initial values of backdoor features 506 in circuit samples (e.g., historical circuits and designs) are recorded. In various embodiments, various modification patterns are then randomly applied multiple times to mutate the values of the backdoor features 506. Four modification patterns are illustrated in FIG. 7. As illustrated in FIG. 7, one logic gate can be modified into one or more logic gates that result in logical equivalence. In some example embodiments, the number of modifications applied to the values of the backdoor features 506 are controlled via a configurable constraint. For example, the number of changes applied may be less than 25 gates to satisfy the negligible overhead requirement. With the modification patterns shown in FIG. 7, values for backdoor features 506 such as flipflop_out_5, loop_out_5, and pout are mutated.

After mutation, the modified patterns of backdoor features are considered as backdoor "signatures" to indicate whether a circuit or a design has been retrofitted intentionally (e.g., by an adversary) or not. Then, the task of backdoor training is to feed these malicious and modified circuit samples into the payload model 510 to train it to remember these "signatures". In various embodiments, the payload model 510 works as a binary classifier, aiming at predicting whether input samples include the "signatures". This approach fulfills the desired constraint-checking functionality of the payload model 510, as shown in FIG. 6.

The structure and architecture of the payload model 510 may be more complex than that of the first machine learning model 508. While a simpler structure for the payload model 510 results in easier training and harder detection due to its small overhead when injected into the first machine learning model 508, it often provides lower attack success rate for its limited capability. On the other hand, a complicated structure for the payload model 510 usually guarantees the performance in terms of backdoor attack success, but comes at the cost of higher training cost as well as higher risk of being detected when injected into the first machine learning model 508.

In various embodiments, normal training and backdoor training are performed separately. The normal training and backdoor training are performed separately for the following reasons. If normal training and backdoor training are combined into one learning model, both normal and malicious inputs are fed into the one single learning model. In this case, the learning model is enforced to distinguish inputs with different labels even though the inputs only differ slightly from each other. As a result, the training difficulty is significantly increased. Moreover, combined learning can lead to an overfitting problem.

Furthermore, performing the normal training and backdoor training separately makes the proposed attack more flexible. Attacks with different backdoor types can be launched and, instead of retraining the entire model, the normal model generated by the normal training process can be directly inherited. In this regard, only the backdoor training process need to be specified. Moreover, performing the normal training and backdoor training separately naturally enables parallel model training. For example, the normal model and the payload model can be trained in parallel. As a result, the average model training efficiency can be significantly improved.

With the payload model 510 and the first machine learning model 508 each being trained, the payload model 510, as the AI-based Trojan, is injected into the first machine learning model 508 during Trojan injection. Algorithm 2 provides one example embodiment of backdoor training and Trojan injection.

| Algorithm 2: Backdoor Training and Trojan Injection |
| --- |
| Input: Circuit samples $\{x_i\}$ and labels $\{y_i\}$, Normal model $M_\Theta$, payload model $\overline{M_\Theta}$, maximum of mutation times max_mut<br>Output: Backdoored Model M*<br>1  initialization;<br>2  N = \|{$x_i$}\|<br>3  for i = 1 ... N do<br>4    \| iter = rand(0, max_mut)<br>5    \| for i = 1 ... iter do<br>6        \|    \| $x_i'$ = mutate($x_i$);<br>7  Label all $x_i$ as 0, $x_i'$ as 1<br>8  X* = $\{x_i\} \cup \{x_i'\}$<br>9  repeat<br>10    \| for each $x_i^* \in$ X* do<br>11    \|    \| out$_i$ = softmax($\overline{M_\Theta}(x_i^*)$)<br>12    \|    \| $\text{loss} = \sum_i^{2N} \text{cross\_entropy}(\text{out}_i, \text{label}(x_i^*))$<br>13    \|    \| $\overline{\Theta}$ = sgd($\overline{\Theta}$, $\nabla$loss)<br>14  until converge;<br>15  M* = $-\lambda \cdot H(\overline{M_\Theta}(x_i)) \cdot \mathcal{L}(M_\Theta(x_i), y_i)$<br>16  Return M* |

As discussed, the backdoor training results in the desired payload model 510, and to complete an attack on the benign model (e.g., the first machine learning model 508), the payload model 510 is injected into the benign model. As described in FIG. 6, the desired functionality of payload model 510 is to produce some perturbation that suffices to switch classifier prediction when the trigger condition is satisfied, and maintain silence otherwise. In various embodiments, the output of resulting "backdoored" model, or first machine learning model 508 having the payload model 510 injected, can be defined with Equation 1.

$$\text{output} = -\lambda \cdot H(\overline{M}_{\overline{\theta}}(x_i)) \cdot \mathcal{L}(M_{\theta}(x_i), y_i) \qquad \text{Equation 1}$$

In Equation 1, $\lambda$ represents a regularizer, $\overline{M}$ represents the payload model, M represents the normal model, and H represents a unit-step function (e.g., the Heaviside step function). In this case, when an input circuit is recognized as "1" (with backdoor signature) by the payload model 510, $H(\overline{M}_{\overline{\theta}}(x_i))=1$, and the output is a scaled inverse of normal model output. In terms of "0" label (without backdoor signature), $H(\overline{M}_{\overline{\theta}}(x_i))=0$, and the output is 0. By combining the output layers, the normal model and the payload model 510 may be assembled together, in various embodiments. After pruning and node merging, the result is the desired backdoored ML model (e.g., backdoored model 512). Thus, the payload model 510, as an AI-based Trojan, is embedded into the normal model and hides behind or within the entire structure.

Accordingly, with the injection of AI-based Trojans into normal machine learning models, potential vulnerabilities of the normal machine learning models can be demonstrated and identified. For example, new backdoor signatures can be added in an input circuit or design to determine whether the new backdoor signatures can evade detection by the normal machine learning models or not. Use of the payload model 510 then enables intelligent and experimental design of ML-based detection systems for hardware Trojans 100 with improved security.

There exists a plurality of possible defense mechanisms to alleviate the AI Trojan attacks for HT detection. These possible defense mechanisms can be divided into three major categories, namely trigger elimination, backdoor elimination, and backdoor mitigation.

Trigger elimination focuses on detecting whether an input sample contains the trigger or not, and a majority of the approaches in this category apply anomaly detection. However, trigger elimination can be circumvented by well-chosen backdoor features and exploiting the orthogonality of input gradients.

Backdoor elimination detects whether a learning model is injected with a trigger or not. Most of these type of approaches are assumption based, where the ML model is scanned for detection. However, backdoor has limited applicability in specific scenarios since it is based on assumptions and usually requires expensive retraining of the learning model.

Backdoor mitigation address the AI trojan attack threat by alleviating backdoor behavior from previously trained victim models. Example approaches include pruning neurons that are dormant on clean inputs, fine-tuning the learning model on a clean dataset, and/or utilization of Bayesian Neural Networks.

As illustrated in FIG. 8, known defense strategies such as pruning, Bayesian Neural Networks, neural cleansing, artificial brain stimulation, and STRIP can be categorized under one of the above-mentioned trigger elimination, backdoor elimination, and backdoor mitigation categories.

Pruning is the process of removing over-weighted connections in a neural network, aiming at accelerating the processing speed within the network, while reducing the size of the ML model. The principle behind pruning is the assumption that deep neural networks (DNNs) are commonly over-parameterized. The depth of DNNs and the large number of neurons grant this type of model with the ability to simulate the input-output relationship inherited in various tasks. However, the overwhelming size and complicated structure inevitably contains unused parameters. Therefore, pruning a neural network can be thought of as removing unused parameters from the overparameterized neural network.

As shown in FIG. 9, pruning can be done by removing either redundant weights (connections) or nodes (neurons). The pruning process is achieved by setting individual parameters to zero, which usually leads to sparse matrices in the network and can be further accelerated by sparse coding. Pruning is generally a model compression technique, not a specific strategy to defend against AI Trojan attacks. However, the key factor that makes pruning effective against AI Trojan attacks is the removal of redundancy. As described above, a Trojan-embedded model works as any benign model would unless attacker-chosen inputs are given, which means the backdoor trigger is a redundant component when dealing with clean inputs. Therefore, a feasible defense method is to test the suspicious model with a sufficient number of clean inputs, sort the nodes/weights by importance, and remove the unimportant parts.

While pruning is a feasible approach to defend against AI Trojan attacks, pruning has two major drawbacks. The pruning strategy is fragile when the AI Trojan attack applies nodes/weights merging steps, as shown in (c) of FIG. 3. Intuitively, the redundancy has been evenly distributed through the merging of nodes. Therefore, there is no way to effectively find less-important nodes from the neural network. Furthermore, when the model undergoes pruning, it can lead to loss of accuracy. Therefore, the users must consider the recovery of accuracy while pruning.

Bayesian neural networks (BNNs) are another option to defend against AI Trojan attacks. BNNs are a special type of DNNs. In traditional DNNs, weight values are real values and are commonly fixed after training. There is a fundamental difference between DNNs and BNNs. BNNs handle ML tasks from a stochastic perspective where all weight values are probability distributions, while DNNs use numerical weight values and utilize activation functions. BNNs extend standard networks with posterior inference in order to control randomness in ML processes.

FIGS. 10A-10B illustrate a comparison of a DNN and a BNN. FIG. 10A illustrates how a DNN has weight values and utilizes activation functions to introduce non-linearity. In contracts, FIG. 10B illustrates how a BNN is a stochastic neural network with probability distributions over the weights.

If a BNN is used as the target ML model, both data poisoning or model injection methods can be blocked for the following reasons. BNNs have natural resistance against data poisoning. BNNs produce output values with uncertainty, which severely limits the performance of any targeted attack. Also, in a data poisoning attack, the goal is to train a model where a small change in input (noise) can cause significant change of output, which is protected by BNNs' regularization properties. Similarly, model injection also suffers from the uncertainty possessed by BNNs.

The pruning technique is fragile against model injection attack due to the fact that the backdoor trigger nodes are merged with those benign ones (shown in (c) of FIG. 3). Without merging the two networks (as in (b) of FIG. 3), a user can easily detect/remove the backdoor by pruning. In fact, it can be easy to identify the model structure since in most cases of MLaaS, the users typically specify the architecture of the expected ML model. In traditional DNNs, edges connecting nodes contain only fixed weight values, therefore, merging two neural networks is straightforward. However, in case of BNN, there is no naive way to merge two probability distributions with different variables. In this case, even the joint-distributions are not equivalent to the "add" operation for distributions. As a result, a model injection attack may not be effective in BNNs due to the inability of merging nodes.

There are still limitations on applying BNNs against AI Trojan attacks. BNNs are only feasible for partially-outsourced scenarios in which a user retrains a downloaded model to adapt the downloaded to perform an HT detection task. However, in a fully-outsourced scenario, the ML model is provided to users as a black-box. Even if the user specifies the structure and type of model, the adversary can somehow introduce randomness to the malicious model and falsely claim it to be a BNN. Furthermore, BNNs suffer from two main drawbacks. First, BNNs are computationally expensive. Therefore, they are not suitable for large-scale problems in terms of efficiency. Second, BNNs enforce random variables to be in a cause-effect relationship. As a result, it is not suitable for hardware Trojan detection.

Both pruning and applying BNNs are mitigation techniques to render the backdoor ineffective, whereas neural cleansing eliminates the backdoor entirely by directly detecting the existence of the backdoor in the ML model. As shown in FIG. 12, the key intuition of the neural cleanse method is that, for an infected model, it uses small modifications to cause misclassifications of the target label. The top diagram in FIG. 12 shows a clean model, where significant modification is needed to shift the samples of type B and type C across the decision boundaries to be misclassified into label A. The bottom diagram of FIG. 12 shows the infected model, where the infected model needs minor modification to move samples across the boundary.

This intuition is based on the assumption that a small change of input (noise) can cause significant change of output due to existence of a backdoor. It works by crafting perturbed input samples to test if significant change happens at the output. Unlike pruning or BNN, neural cleansing is not interested in removing the backdoor trigger or prevent attack from happening, it focuses on maximizing the chances of raising red flag when backdoor exists.

To achieve this, the system iterates through all labels of the model and determines if any labels require a significantly smaller amount of modification to achieve misclassification. Application of the neural cleanse method for hardware Trojan detection is easier since there are only two labels, clean or HT implanted. Therefore, the working steps can be simplified as: (i) for a given design, continuously add 'noise' by randomly applying adversarial patterns, (ii) check if any of the modifications unintentionally activated the trigger so that there is significant change at the output.

Neural cleanse is a promising technique for eliminating backdoor attacks. However, it has two major limitations: uncertainty and expense. There are no precise guidelines for making modifications to maximize the opportunity to trigger the backdoor. This is analogous to random test generation for hardware Trojan detection, where the chances of triggering Trojans is very low, and in the worst case, the backdoor is out of the coverage of generated test patterns. Furthermore, since the neural cleanse technique relies on somewhat random choices, it can be expensive in terms of effort to apply this strategy. One major motivation for applying ML to detect HT is the relatively low cost compared to traditional test generation schemes. If neural cleansing is used, the end user will have to exert significant effort to defend against possible attacks towards the ML models themselves. In other words, applying ML for HT detection is not beneficial if the end user has to rely on time consuming neural cleanse for defense purposes.

Artificial brain stimulation (ABS) is a novel approach that scans the entire ML model seeking a potential backdoor by analyzing inner neuron behaviors through a stimulation method. ABS is performed in 3 steps. First, it locates suspicious neurons inside the ML model, which substantially elevates the activation of a particular output label regardless of the provided input. Neurons acting like this are considered a potential backdoor. Second, with the suspicious nodes obtained, the system can craft the Trojan triggers through reverse engineering. The crafted triggers are attached to clean inputs. Finally, this artificial Trojan-embedded input is given to the model to confirm whether it produces incorrect labels. If yes, the backdoor is detected.

ABS is similar to Neural Cleanse. However, there is one major difference: unlike randomly generating inputs that occasionally activate the trigger in Neural Cleanse, ABS starts by locating suspicious targets. Considering the analogy of hardware Trojan detection, Neural Cleanse acts like random test generation, while ABS works like constrained-random or directed test generation that aims at activating potential backdoor triggers (e.g., rare signals). However, ABS still assumes that a user has full access to the ML model, which is not realistic in a fully-outsourced scenario. Moreover, ABS is designed for solving targeted attacks. In the case of untargeted attacks, ABS is likely to be less effective.

STRIP is a strong defense against Trojan Attacks on DNNs. STRIP is an experience-based trigger-detection method which aims at detecting suspicious backdoor triggers from inputs. Through heuristic analysis as well as experimental evaluation, a drastic difference in entropy between clean inputs and Trojan-inserted inputs has been observed. STRIP works by fusing the input samples with multiple clean samples. Then STRIP applies the fused input to the backdoored model and calculates the entropy of model outputs. In general, a low entropy in predicted classes usually violates the input dependence property of a benign model and implies the presence of a malicious Trojan-embedded input.

There are still many limitations for STRIP, especially when applied for HT detection. For instance, STRIP was proposed and examined in the computer vision domain. STRIP is assumption based, but whether the entropy assumption still holds for hardware circuit features remains unclear. Furthermore, STRIP utilizes the distributed output from the last layer of the model, which is not applicable in a fully-outsourced scenario, where users only receive the prediction results from the model. Moreover, STRIP assumes that the user has access to Trojan-embedded samples under the threat model, which is usually not the case. Therefore, STRIP is not effective in realistic scenarios.

Example Experimental Implementation of Various Embodiments

Various embodiments of the present disclosure are evaluated experimentally with studies included in the present disclosure. An experimental evaluation is performed on a host machine with Intel i7 3.70 GHz CPU, 32 GB RAM and RTX 2080 256-bit GPU, with code developed using Python for model training. Specifically, PyTorch is used as the machine learning library. To enable comprehensive evaluation, the experiments are deployed utilizing 50 gate-level netlist benchmarks from Trust-Hub. Features are extracted from benchmarks and formatted into PyTorch tensors, making them compatible with any ML models requiring tensor inputs. In various experiments, the payload model 510 is designed different. In one experiment, the payload model 510 is applied as a multi-layer perceptron (MLP) comprising 3 fully-connected layers. In another experiment, the payload model 510 is applied as a Lenet-5 like structure comprising three convolution layers followed by two fully-connected layers. In another experiment, the payload model 510 is applied as a GoogleNet like structure with a depth of 22 layers. Thus, various configurations of the payload model 510 are evaluated.

Assume that M represents the normal model and M* represents the backdoored model with the original sample circuits dataset $\{(x_1, y_1), (x_2, y_2), \ldots, (x_n, \ldots, y_n)\}$ and modified circuits dataset $\{(x_1', y_1'), (x_2', y_2'), \ldots, (x_n', y_n')\}$. Given this, three metrics are used to evaluate the performance of the different embodiments of the payload model 510: baseline accuracy, attack success rate, and backdoor accuracy.

Baseline accuracy is computed as $$\sum_i^n \frac{\mathbb{1}(M(x_i) = y_i)}{n},$$

which represents the prediction accuracy of the normal model with original samples. $\mathbb{1}$ represents the indicator function.

Attack success rate (ASR) is $$\sum_i^m \frac{\mathbb{1}(M^*(x_i') \neq y_i')}{m},$$

which represents prediction accuracy of the backdoored model with modified samples.

Backdoor accuracy is $$\frac{\sum_i^n \mathbb{1}(M^*(x_i) = y_i) + \sum_i^m \mathbb{1}(M^*(x_i') \neq y_i')}{n + m},$$

which represents the prediction accuracy of the backdoored model with all samples.

To evaluate the effectiveness of the various embodiments, the AI-based Trojan framework 500 generally involving the payload model 510 is compared against an alternative attack and defense. The alternative attack is GAE, which is a state-of-the-art adversarial attack based on generating adversarial examples. The defense is STRIP, which is a state-of-the-art defense against AI-based Trojan attacks.

FIG. 11 compares the performance of three different implementations of the payload model 510 in three respective graphs. In each graph, baseline accuracy, backdoor accuracy and attack success rate are provided. The x-axis of the graphs represents the upper bound on the number of mutations applied during backdoor training (e.g., as defined in Algorithm 2), where larger x-values represent more modifications to the input samples. In the experiment, the normal model achieves 98.5% baseline accuracy for normal samples. The backdoor accuracy of all three payload model structures are slightly lower than the baseline accuracy. This difference comes from the effect of payload model. This is supported by the observation that the backdoor accuracy is nearly proportional to the ASR. The closer ASR is to perfection, the closer backdoor accuracy are to the baseline.

In other words, it represents the performance of backdoored model (having an injected payload model) "mimicking" the normal model's behavior.

In terms of attack success rate, the simpler (lightweight) payload model implies faster convergence to perfection. For example, MLP needs about 5 mutations while GoogleNet requires 20 mutations to reach 100% ASR. However, as shown, the ASR of MLP is unstable. Even after it hits perfection, it oscillates at a 10% amplitude. Instead, complicated model like GoogleNet requires more modifications to reach convergence, but it becomes very stable once reaches 100% success rate. This is expected due to simple models' limited capability in handling complex features. Larger number of mutations brings expanded feature space, and it is likely for these lightweight models to get overfitted. In other words, some normal samples may satisfy the payload model and get their classification result switched. Therefore, the mutation number should be carefully selected for simple structures. In various embodiments, the mutation number is proportional to a number of layers of the payload model 510, a total number of nodes of the payload model 510, a complexity measure of the payload model 510, and/or the like.

FIG. 13 compares the ASR of various embodiments described herein with the alternative attack, GAE. As shown, GAE's ASR is much lower than the that of the various embodiments of the payload models 510. This significant difference comes from the design strategy. GAE applies mutations on circuits and then directly feed them into models to alter its outputs. In various embodiments of the present disclosure, backdoor features 506 are extracted and fed into an extra model. Intuitively, this extra model acts as both an extractor and an amplifier. It recognizes backdoor features 506 and enables fusion of its output with results from the normal model. As a result, a small amount of mutations suffices to alter the classification result. In contrast, GAE does not have such amplifying effect, and it usually requires a large number of mutations to create changes in the output layer. Therefore, it provides inferior attack performance, resulting in reduced effectiveness in demonstrating and/or identifying potential vulnerabilities in machine learning models. GAE also faces the risk of being detected due to requiring a larger number of mutations.

Various embodiments of the present disclosure have also been evaluated against a partially-outsourced threat model. In this scenario, each ML model trained on attacker-chosen dataset is further retrained to adjust to user-specific benchmarks. During this retraining process, all model parameters are visible and can be tuned by users. The various embodiments have been compared to all three previously proposed structures (MLP, Lenet, and GoogleNet) and GAE. For each model, unseen benchmarks have been randomly selected along with generated synthetic designs used as exemplary user-specific datasets for retraining the model. The retaining phase is composed of 200 epochs and two different training strategies that are commonly utilized in practice were employed. The first training strategy is normal training, where no defensive schemes are applied and the transfer learning process only focuses on adjusting the model to users' data. The second training strategy is adversarial training, where users also craft adversarial samples themselves by randomly applying adversarial patterns such as those shown in FIG. 7. Adversarial training is a strong defense against adversarial attacks. In this way, the models are expected to be resistant to malicious inputs that are polluted by adversarial patterns.

Both the accuracy of the retrained model and the ASRs of attacks are presented in Table 2. Each row in the table represents the average performance of the two transfer learning methods (normal training and adversarial training) of each model. For each method, the columns with the Accuracy label represent the HT detection rate of the model on clean input samples to demonstrate the model's basic functionality, while the ASR label implies the attack success rate of each attack algorithm. As shown in the results, through normal training, all models are well-tuned to user-specific data by reaching >90% accuracy. One important observation is that GAE is fragile to transfer learning, while the proposed AI Trojan attack still maintains decent ASRs.

TABLE 2

| Models | Normal Training | | Adversarial Training | |
|---|---|---|---|---|
| | Accuracy | ASR | Accuracy | ASR |
| MLP | 90.3% | 65.5% | 75.1% | 60.5% |
| Lenet | 98.5% | 77.7% | 98.0% | 68.0% |
| GoogleNet | 99.5% | 82.1% | 94.6% | 76.1% |
| GAE | 99.2% | 14.5% | 94.0% | 11.1% |

The key difference between GAE and the proposed attack is the way the model is designed. In the proposed AI Trojan attack, the entire model is composed of two parts, a benign model for expected functionality, and a payload model for malicious attacks. Even if users retrain the model on newly unseen benchmarks, the parameters that are drastically changed are those inside the benign model since they are responsible for reacting to the HT detection task while they remain unaffected for all components associated with the payload model. For GAE, the noise sample is calculated through a gradient approach but the model is retrained on a new dataset. The ways of computing adversarial noise have to be changed accordingly otherwise it is not effective, as shown by the resultant low (14.5%) ASR.

In the case of adversarial training, while it did provide the models with resistance towards the proposed attacks of various embodiments, as each of the models' ASR decreases to some extent. However, the attacks still can achieve >60% ASR. In adversarial training, unless the users have full access to adversary-chosen inputs, the crafted adversarial samples are randomly generated and cannot guarantee to cover all possible trigger conditions. Therefore, for uncovered trigger conditions, they remain effective to make the backdoor attack succeed. Thus, to defend against the proposed AI Trojan attack, users have to craft numerous synthetic adversarial samples to increase the coverage, making the defense strategy expensive and inefficient. Furthermore, as shown in the third column of Table 2, adversarial training will decrease the performance of the models' basic functionality, as the models have to adjust to some data samples containing noise.

In an overhead analysis, Table 3 compares the training cost and data resources of the various embodiments of the payload model 510 and the GAE attack. The MLP structure for the payload model 510 is the most economical in terms of training cost. It can be trained within 50 epochs with each epoch taking 0.6 s, and only requires 20% of the training samples to be malicious. However, GoogleNet is very costly, it needs 500 of 0.37 s training epochs. GAE requires moderate training cost, comparable to Lenet. However, it requires a large number of mutations, and still provides inferior attack performance compared to the various embodiments of the payload model 510.

TABLE 3

| Models | Time(s) | Epochs | Malicious/Benign Division | # Mutation |
|---|---|---|---|---|
| MLP | 0.6 | 50 | 2/8 | 6 |
| Lenet | 1.7 | 200 | 2/8 | 18 |
| GoogleNet | 72.4 | 500 | 5/5 | 21 |
| GAE [9] | 1.0 | 200 | 4/6 | 44 |

Additional experiments further evaluate the robustness of various embodiments described herein against the state-of-the-art defense schemes described above, namely pruning, Bayesian Neural Networks, neural cleanse, artificial brain stimulation, and STRIP. Aside from adversarial training, which is designed for alleviating adversarial attacks, various embodiments were further evaluated to document the performance of the proposed attack against state-of-the-art defense strategies that are primarily designed for AI Trojan attacks. Although dropout is inherently applied to the normal model, pruning still serves an important role in eliminating AI Trojans. Dropout is a temporary and random method designed to drop certain activations of nodes stochastically during the training. As a result, each training observation uses only a subset of available nodes. This prevents the model from becoming over-reliant on a few well performing nodes. As a result, it is likely to make all nodes equally powerful. In contrast, pruning is a permanent operation, and is determined by an importance ranking algorithm. It is a post-training removal of nodes that are non-important. Therefore, only well-performing nodes remain and get utilized in real-world applications.

Table 4 shows the result of applying pruning on various models. Notice for each model, the effectiveness of pruning with and without nodes merging has been evaluated. Merging indicates that some of the connections and neurons inside the model are merged prior to pruning. As seen in Table 4, pruning is effective at dealing with models without nodes merging. The ASRs of all three models are significantly decreased since pruning removes most of the sensitive triggers, thereby making it harder for the backdoor attack to be activated. However, the fragility of pruning is demonstrated when dealing with models that have undergone a merging process, and as shown in Table 4, the ASRs are all >95%. In other words, the pruning is not effective to defend against the proposed attack since pruning can be easily circumvented by merging nodes.

TABLE 4

| Models | MLP | Lenet | GoogleNet | Average |
|---|---|---|---|---|
| With Merging | 95.6% | 99.6% | 99.8% | 98.3% |
| Without Merging | 33.8% | 25.5% | 11.6% | 23.6% |

Utilization of BNNs is another promising backdoor alleviation scheme. Due to the randomness introduced by the Bayesian method, each model is tested in 30 trials and the ASRs of all trials are plotted. For each attack, the number of mutations is set to 25. In other words, the crafted backdoored inputs can achieve 100% ASR for normal DNNs. As seen in FIG. 14, the ASRs are very low (<50%). For simpler models like MLP, when changed from normal weight edges to stochastic connections, the randomness severely affects the performance of the backdoor attack, which makes the trigger conditions even harder to be activated. As expected, and as shown in FIG. 14, the simpler ML model structure implies the lower ASRs. FIG. 14 shows the attack success rate of the proposed attack algorithm against Bayesian Neural Networks. To better evaluate the performance, each model was tested for 30 trials and, for each attack, the number of mutations were set to 25 so that they are sufficient to achieve 100% ASR for normal DNNs.

Based on the results, it will be appreciated that the utilization of BNNs is a powerful strategy to defend against the proposed attack of the various embodiments. However, when considering the use case of MLaaS, there is no guarantee that the user can specify the type of ML model to be used in fully-outsourced scenario. As outlined above, in a fully-outsourced MLaaS scenario, the user only receives a well-trained ML model for a specific task. The ML model works in a black-box manner, all the design details (type of model, parameters, etc.) are hidden to the user. Even in case of a partially-outsourced model, it is relatively easy for the adversary to bypass users' verification. The only difference between a BNN and a traditional DNN is that BNNs utilize randomness for edge and node values. The attacker can introduce random noise at the output layer to craft an illusion of a BNN. Therefore, BNNs cannot be considered as a perfect defense.

Aside from backdoor alleviation schemes, the performance of direct backdoor detection algorithms Neural Cleanse and ABS were also evaluated. These two algorithms aim at generating test input samples to interact with the model, so as to make classification on whether the ML model is injected with a backdoor or not. Both Neural Cleanse and ABS need the parameter details of the outsourced ML model and expert knowledge to craft adversarial samples.

TABLE 5

| Models | Neural Cleanse | | | ABS | | |
|---|---|---|---|---|---|---|
| | DA | #Tests | Time | DA | #Tests | Time |
| MLP | 98.3% | 58.1 | 17.6 s | 84.4% | 6.5 | 48 s |
| Lenet | 82.5% | 144.4 | 79.5 s | 78.0% | 19.8 | 20.5 s |
| GoogleNet | 87.1% | 2106.5 | 16445.8 s | 69.0% | 55.3 | 176.8 s |
| Average | 89.3% | 769.7 | 5514.3 s | 77.1% | 27.2 | 81.8 s |

The evaluation results are presented in Table 5 and each row represents the average performance of the two defense algorithms (Neural Cleanse and ABS) for each model. For each defense algorithm, the columns with the DT label represent the detection accuracy of the algorithm, while the #Tests label implies the average number of test input samples that are necessary for the algorithm to make classification, and the Time label indicates the total time for completing the detection process. As seen in the results, Neural Cleanse is computationally expensive compared with ABS. It needs more than 10000 s for a large-scale model, which may not be acceptable for practical usage. ABS performs better in terms of time efficiency, but its detection accuracy is inferior compared with Neural Cleanse. For GoogleNet, the detection rate is below 70%, making the algorithm fragile towards attacks.

Both of the Neural Cleanse and ABS algorithms focus on generating input samples that interact with the suspicious model to examine the existence of a backdoor. However, they address test generation from complementary perspectives. In the case of Neural Cleanse, the test generation algorithm focuses on the dataset. Specifically, it measures the minimum amount of perturbation necessary to change all inputs from one label to another and generates tests with that amount of perturbation. In the case of ABS, the test generation algorithm focuses on the model itself. Specifically, the ABS algorithm scans the ML model, extracts suspicious backdoor regions, and generates test inputs that can activate these regions. These two test generation algorithms require different number of test patterns for convergence, which is an important indicator of the detection effectiveness. In other words, ABS is faster since it requires less test vectors for convergence. However, ABS provides inferior detection accuracy due to the fact that ABS focuses on locating suspicious region in neural network regardless of input samples and are vulnerable towards nodes merging strategy. As a result, there is a clear trade-off of effectiveness and efficiency between Neural Cleanse and ABS.

Time efficiency has been taken into consideration for two important reasons. If there are multiple models to be examined in industrial applications, a long detection time for each model can lead to unacceptable overall cost. Furthermore, the detection time should be fast in many real-world scenarios in order to mitigate cyberattacks, otherwise, the Trojan may be triggered to damage the system before the detection result is available. Both algorithms assume that the user has access to the parameter details of the outsourced ML model, and has expert knowledge to craft effective inputs, which are usually not guaranteed in practice.

Since pruning simplifies ML model and might change the structure of neural networks, it is important to evaluate the effectiveness of these methods in the context of pruning. The performance of Neural Cleanse & ABS with and without pruning has been evaluated and the results are detailed in Table 6. As seen in Table 6, the pruning did not improve the detection accuracy. In the case of ABS, the detection accuracy even drops slightly compared with non-pruning scenario for Lenet and GoogleNet.

TABLE 6

| Models | Neural Cleanse | | ABS | |
|---|---|---|---|---|
| | Non-Pruning | Pruning | Non-Pruning | Pruning |
| MLP | 98.3% | 98.1% | 84.4% | 84.5% |
| Lenet | 82.5% | 82.5% | 78.0% | 77.8% |
| GoogleNet | 87.1% | 87.7% | 69.0% | 62.3% |
| Average | 89.3% | 89.4% | 77.1% | 74.8% |

These observations are expected since pruning is a mitigation technique while Neural Cleanse & ABS are detection techniques. As a result, if a backdoor Trojan can be alleviated by pruning, then there is no scope for detection. On the other hand, if the Trojan can evade pruning, then the detection techniques are likely to face the same level of difficulty. Although pruning can simplify the network, it did not help improving the detection accuracy for the following reasons. The proposed attack of various embodiments utilizes node merging to circumvent pruning. Also, Neural Cleanse is based on input dataset, which is not affected by the pruned model structure. ABS does not get any benefit of pruning since ABS focuses on extracting suspicious structures. In fact, pruning removed certain suspicious nodes as redundant components, which slightly deteriorated the detection performance.

Additional experiments further evaluate the robustness of various embodiments described herein against the state-of-the-art defense scheme, STRIP. STRIP aims at identifying if a given input is clean or contains a backdoor trigger. It works by fusing the input sample with multiple clean samples. Then, STRIP applies the fused input to the backdoored model and calculates the entropy of model outputs. This defense strategy relies on the observation that backdoored inputs tend to produce lower entropy outputs compared to the clean ones, so that by checking their entropy distributions, backdoored inputs can be clearly distinguished.

FIG. 15 shows the entropy distribution of outputs from both GAE and the proposed method applied on clean and backdoored inputs over different models. The first row presents the performance of GAE, while the second row presents the performance of proposed attack. The number of mutations of each type of model has been denoted (five (5) mutations for MLP, ten (10) mutations for Lenet, and fifteen (15) mutations for GoogleNet), as well as the respective entropy values. The X axis represents the feature values while the Y axis represents the probability percentage. As seen in FIG. 15, the proposed algorithm possesses significantly less entropy values compared with GAE. The distribution of entropy for backdoored data overlaps with the distributions of entropy of the clean data for the payload models 510 while GAF's entropy can be clearly distinguished from the normal ones.

During this evaluation, backdoor features 506 that are orthogonal to normal features 504 have been intentionally selected. Therefore, applied mutations do not affect the normal features, which avoids drastic changes in output entropy. Furthermore, the mutations in GAE are gradient-driven, where feature values are clustered around peak values, leading to a small entropy value. The proposed method of various embodiments is able to bypass the state-of-the-art defense (STRIP) while state-of-the-art attack (GAE) fails.

Table 7 summarizes the effectiveness, overhead and applicable scenarios of all five state-of-the-art defense strategies against the proposed AI Trojan attacks of various embodiments. It will be appreciated that the proposed attack is resistant against pruning, ABS and STRIP. Neural Cleanse and BNN can provide relatively better defense. However, it is expensive for Neural Cleanse and BNNs to defeat the proposed attack, as demonstrated above. Furthermore, the assumptions made by these defense strategies (e.g. full access to model parameters) may not be feasible.

TABLE 7

| Algorithms | Effectiveness | Overhead | Fully Outsourced | Partially Outsourced | Assumptions |
|---|---|---|---|---|---|
| Pruning [15] | Low | Low | Not Applicable | Applicable | Users have full access to model parameters. |
| BNN [24] | High | High | Applicable | Applicable | Users may specify the structure of ML models. |
| Neural Cleanse [14] | High | High | Not applicable | Applicable | Users have full access to model parameters. |
| ABS [21] | Mediocre | Mediocre | Not applicable | Applicable | Users have full access to model parameters. |
| STRIP [16] | Low | Low | Applicable | Applicable | User have access to Trojan-embedded samples |

There are several reasons for the superior performance of Neural Cleanse and BNN compared to pruning, ABS and STRIP. An AI Trojan attack introduces unpredictable changes to non-targeted neurons that makes the triggers harder to detect and resistant to filtering and neuron pruning. Neural Cleanse is able to identify the sensitive nodes and reconstruct possible triggers to evaluate the existence of backdoor triggers, which is irrelevant to the model's structure itself.

BNNs have natural resistance against AI Trojan attack for two reasons. First, BNNs produce output values with uncertainty, which severely limits the performance of any targeted attack. Second, the uncertainty possessed by BNNs prevents the backdoor injection process. In an AI Trojan attack, the backdoor detector must be merged into the benign model (shown in (c) of FIG. 3). Without merging the two networks (as in (b) of FIG. 3), the user can easily detect the backdoor by identifying the model structure, since in most cases of MLaaS, the users typically specify the architecture of the expected ML model. In this case, BNN's property prevents it from merging of nodes. In traditional DNNs, edges connecting nodes contain only fixed weight values, therefore, merging two neural networks is straightforward. However, in case of BNN, there is no naive way to merge two probability distributions with different variables.

The detection performance by varying Trojan complexity (size) has also been analyzed. A complicated Trojan is likely to create more differences compared to simple ones, making it easier to detect by side-channel analysis. FIG. 16 shows the relationship between the size of the Trojan (number of mutations) and the detection rate. When increasing the number of mutations (more gates), the chances of detection by defense methods also increases.

The proposed attack of various embodiments would be successful even if the defender is aware of the attack for the following reasons. First, because the AI Trojan is merged with the original model, state-of-the-art pruning methods will not be able to detect or eliminate it as described above. Second, if the defender runs the model on general HT-infected netlists, the model will successfully detect the HTs. In fact, this is ensured by the design of AI Trojan that is expected to work as usual unless the trigger of the AI Trojan is activated. Third, as discussed above, it is infeasible to generate all possible test patterns to activate the AI Trojan trigger due to the exponential nature of the possible input patterns. Overall, the proposed attack of various embodiments is robust against state-of-the-art defenses under realistic settings.

Conclusion

While machine learning (ML) techniques are widely applied in hardware Trojan (HT) detection, ML algorithms may include vulnerabilities towards Trojan attacks. In the present disclosure, a backdoor attack scheme is provided to exploit, demonstrate, and identify these vulnerabilities. Specifically, various embodiments provide an efficient mechanism to design and inject AI-based Trojans (e.g., payload models 510) into ML models trained for hardware Trojan detection. The infected model can hide in plain sight since it can provide expected classification for regular inputs. However, it will produce misclassification for specific attacker-chosen inputs. Extensive experimental evaluation using three implementation of AI-based Trojans demonstrated that various embodiments achieve 100% attack success rate with very few modifications compared to state-of-the-art adversarial attack for ML-based hardware-based cyberattack detection. Accordingly, various embodiments of the present disclosure may be effectively applied in demonstrating and identifying vulnerabilities in machine learning models trained for classification and detection tasks.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A computer-implemented method comprising:
generating, by one or more processors and using a benign machine learning model, a first classification of an input circuit with respect to a hardware-based cyberattack;
generating, by the one or more processors and using a payload machine learning model, a perturbation value for the first classification based on a trigger condition, wherein:
(i) the payload machine learning model is trained based on a plurality of backdoor features and
(ii) the trigger condition corresponds to a backdoor feature of the plurality of backdoor features;
providing, by the one or more processors, a second classification as an output of an outsourced backdoored machine learning model, wherein the outsourced backdoored machine learning model (i) comprises the benign machine learning model inserted with the payload machine learning model and (ii) is trained to generate the second classification based on the first classification and the perturbation value; and
determining, by the one or more processors, a vulnerability associated with the outsourced backdoored machine learning model based on the second classification.

2. The computer-implemented method of claim 1, further comprising:
performing a vulnerability analysis for the benign machine learning model based at least in part on providing an input circuit sample comprising a plurality of input backdoor features to the outsourced backdoored machine learning model.

3. The computer-implemented method of claim 2, wherein the plurality of input backdoor features comprises a modification of at least one logic gate of an original circuit sample associated with the input circuit sample, the modification having logical equivalence with the at least one logic gate.

4. The computer-implemented method of claim 1, wherein the payload machine learning model is trained to output zero values responsive to the plurality of backdoor features not satisfying one or more constraints.

5. The computer-implemented method of claim 1, wherein the benign machine learning model is trained according to supervised learning to generate a classification output based at least in part on a plurality of normal features extracted from a plurality of circuit samples.

6. The computer-implemented method of claim 5, wherein the plurality of normal features and the plurality of backdoor features are orthogonally-variant with respect to each other.

7. The computer-implemented method of claim 1, wherein an output layer of the benign machine learning model is combined with an output layer of the payload machine learning model.

8. The computer-implemented method of claim 1, wherein at least one of one or more nodes or one or more edges associated with the benign machine learning model is merged with at least one of one or more respective nodes or one or more respective edges associated with the payload machine learning model.

9. The computer-implemented method of claim 1, wherein the outsourced backdoored machine learning model comprises a partially-outsourced backdoored machine learning model that is configured to be retrainable.

10. One or more non-transitory computer-readable storage media including instructions that, when executed by one or more processors, cause the one or more processors to perform operations comprising:
generating, using a benign machine learning model, a first classification of an input circuit with respect to a hardware-based cyberattack;
generating, using a payload machine learning model, a perturbation value for the first classification based on a trigger condition, wherein:
(i) the payload machine learning model is trained based on a plurality of backdoor features and
(ii) the trigger condition corresponds to a backdoor feature of the plurality of backdoor features;
providing a second classification as an output of an outsourced backdoored machine learning model, wherein the outsourced backdoored machine learning model (i) comprises the benign machine learning model inserted with the payload machine learning model and (ii) is trained to generate the second classification based on the first classification and the perturbation value; and
determining a vulnerability associated with the outsourced backdoored machine learning model based on the second classification.

11. The one or more non-transitory computer-readable storage media of claim 10, wherein the operations further comprise:
performing a vulnerability analysis for the benign machine learning model based at least in part on providing an input circuit sample comprising a plurality of input backdoor features to the outsourced backdoored machine learning model.

12. The one or more non-transitory computer-readable storage media of claim 11, wherein the plurality of input backdoor features comprises a modification of at least one logic gate of an original circuit sample associated with the input circuit sample, the modification having logical equivalence with the at least one logic gate.

13. The one or more non-transitory computer-readable storage media of claim 10, wherein the benign machine learning model is trained according to supervised learning to generate a classification output based at least in part on a plurality of normal features extracted from a plurality of circuit samples.

14. The one or more non-transitory computer-readable storage media of claim 13, wherein the plurality of normal features and the plurality of backdoor features are orthogonally-variant with respect to each other.

15. The one or more non-transitory computer-readable storage media of claim 10, wherein an output layer of the benign machine learning model is combined with an output layer of the payload machine learning model.

16. The one or more non-transitory computer-readable storage media of claim 10, wherein at least one of one or more nodes or one or more edges associated with the benign machine learning model is merged with at least one of one or more respective nodes or one or more respective edges associated with the payload machine learning model.

17. The one or more non-transitory computer-readable storage media of claim 10, wherein the outsourced backdoored machine learning model comprises a partially-outsourced backdoored machine learning model that is configured to be retrainable.

18. A system comprising one or more processors, a memory, and one or more programs stored in the memory, the one or more programs comprising instructions configured to cause the one or more processors to:
- generate, using a benign machine learning model, a first classification of an input circuit with respect to a hardware-based cyberattack;
- generate, using a payload machine learning model, a perturbation value for the first classification based on a trigger condition, wherein:
  - (i) the payload machine learning model is trained based on a plurality of backdoor features and
  - (ii) the trigger condition corresponds to a backdoor feature of the plurality of backdoor features;
- provide a second classification as an output of an outsourced backdoored machine learning model, wherein the outsourced backdoored machine learning model (i) comprises the benign machine learning model inserted with the payload machine learning model and (ii) is trained to generate the second classification based on the first classification and the perturbation value; and
- determine a vulnerability associated with the outsourced backdoored machine learning model based on the second classification.

19. The system of claim 18, wherein the one or more programs further comprise instructions that are configured to cause the one or more processors to:
- perform a vulnerability analysis for the benign machine learning model based at least in part on providing an input circuit sample comprising a plurality of input backdoor features to the outsourced backdoored machine learning model.

20. The system of claim 18, wherein the outsourced backdoored machine learning model comprises a partially-outsourced backdoored machine learning model that is configured to be retrainable.

* * * * *